United States Patent
Xu et al.

(10) Patent No.: US 10,143,019 B2
(45) Date of Patent: Nov. 27, 2018

(54) METHOD AND APPARATUS FOR SIGNALING BETWEEN ENBS IN A WIRELESS COMMUNICATION SYSTEM SUPPORTING DUAL CONNECTIVITY

(71) Applicant: LG ELECTRONICS INC., Seoul (KR)

(72) Inventors: Jian Xu, Seoul (KR); Kyungmin Park, Seoul (KR); Daewook Byun, Seoul (KR)

(73) Assignee: LG Electronics Inc., Seoul (KR)

(*) Notice: Subject to any disclaimer, the term of this patent is extended or adjusted under 35 U.S.C. 154(b) by 199 days.

(21) Appl. No.: 15/023,880

(22) PCT Filed: Sep. 25, 2014

(86) PCT No.: PCT/KR2014/008956
§ 371 (c)(1),
(2) Date: Mar. 22, 2016

(87) PCT Pub. No.: WO2015/046911
PCT Pub. Date: Apr. 2, 2015

(65) Prior Publication Data
US 2016/0212775 A1 Jul. 21, 2016

Related U.S. Application Data

(60) Provisional application No. 61/882,639, filed on Sep. 26, 2013.

(51) Int. Cl.
*H04W 76/10* (2018.01)
*H04W 76/15* (2018.01)
(Continued)

(52) U.S. Cl.
CPC ......... *H04W 76/10* (2018.02); *H04L 41/0813* (2013.01); *H04W 76/15* (2018.02); *H04W 92/20* (2013.01)

(58) Field of Classification Search
None
See application file for complete search history.

(56) References Cited

U.S. PATENT DOCUMENTS 9,843,924 B2 * 12/2017 Yamada ................ H04W 8/205
2008/0261602 A1 10/2008 Livneh
(Continued)

FOREIGN PATENT DOCUMENTS

WO 2012148217 11/2012
WO 2013073077 5/2013

OTHER PUBLICATIONS

Qualcomm Incorporated, "Backhaul considerations for user plane architectures for dual connectivity," 3GPP TSG RAN WG2 Meeting #81bis, R2-131158, Apr. 15-19, 2013, see pp. 1-3.
(Continued)

*Primary Examiner* — Hicham Foud
(74) *Attorney, Agent, or Firm* — Dentons US LLP

(57) ABSTRACT

In the present invention, the method and apparatus for direct or indirect signaling between eNBs in a wireless communication system that support Dual Connectivity are disclosed. In particular, the method for signaling between eNBs in a wireless communication system that support Dual Connectivity, comprising transmitting, by a first eNB, information indicating whether the first eNB supports the Dual Connectivity function to a second eNB, and transmitting and receiving, by the first eNB, signaling for the Dual Connectivity with the second eNB, if the first eNB supports the Dual Connectivity.

6 Claims, 20 Drawing Sheets

(51) Int. Cl.
*H04L 12/24* (2006.01)
*H04W 92/20* (2009.01)

(56) References Cited

U.S. PATENT DOCUMENTS

| | | | | |
|---|---|---|---|---|
| 2014/0056243 A1* | 2/2014 | Pelletier | ................ | H04W 74/04 370/329 |
| 2014/0080484 A1* | 3/2014 | Centonza | ............ | H04W 76/045 455/436 |
| 2014/0355562 A1* | 12/2014 | Gao | .................... | H04W 76/025 370/331 |
| 2015/0223284 A1* | 8/2015 | Jain | .................. | H04W 52/0258 370/329 |
| 2015/0350883 A1* | 12/2015 | Yamada | ................ | H04W 76/00 370/338 |
| 2016/0029376 A1* | 1/2016 | Fukuta | .............. | H04W 72/0426 370/329 |
| 2016/0050591 A1* | 2/2016 | Israelsson | ......... | H04W 36/0061 370/331 |
| 2016/0057663 A1* | 2/2016 | Teyeb | ............... | H04W 36/0027 455/436 |
| 2016/0112164 A1* | 4/2016 | Worrall | ................. | H04L 5/0032 370/311 |
| 2016/0174285 A1* | 6/2016 | Ke | .......................... | H04W 8/06 370/329 |
| 2016/0330657 A1* | 11/2016 | Yamazaki | ............ | H04W 76/025 |
| 2017/0215185 A1* | 7/2017 | Fukuta | ............. | H04W 72/0426 |

OTHER PUBLICATIONS

Intel Corporation, "S1 versus X2 Approach for Dual Connectivity," 3GPP TSG RAN WG2 Meeting #81bis, R2-131403, Apr. 15-19, 2013, see pp. 1-8.

* cited by examiner

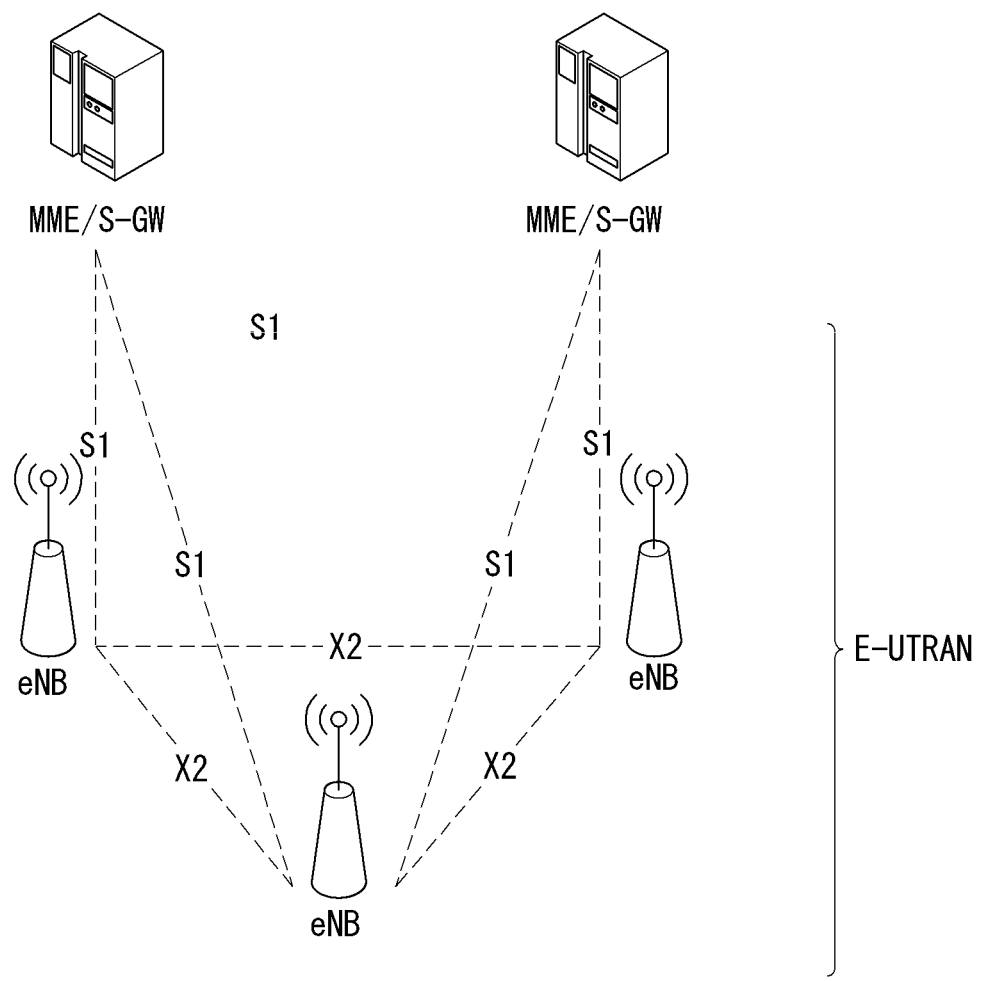

[FIG. 2]
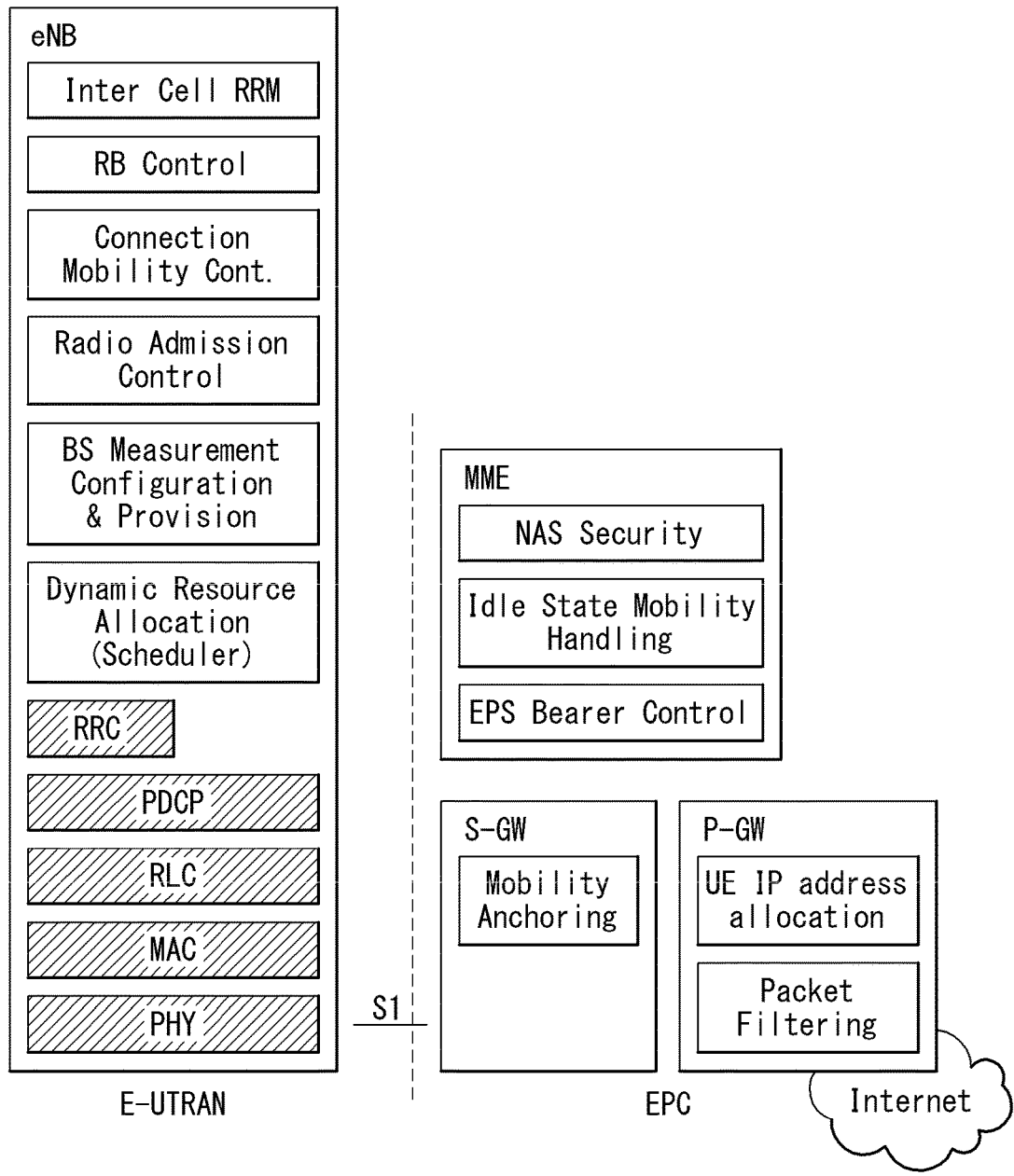

[FIG. 3]
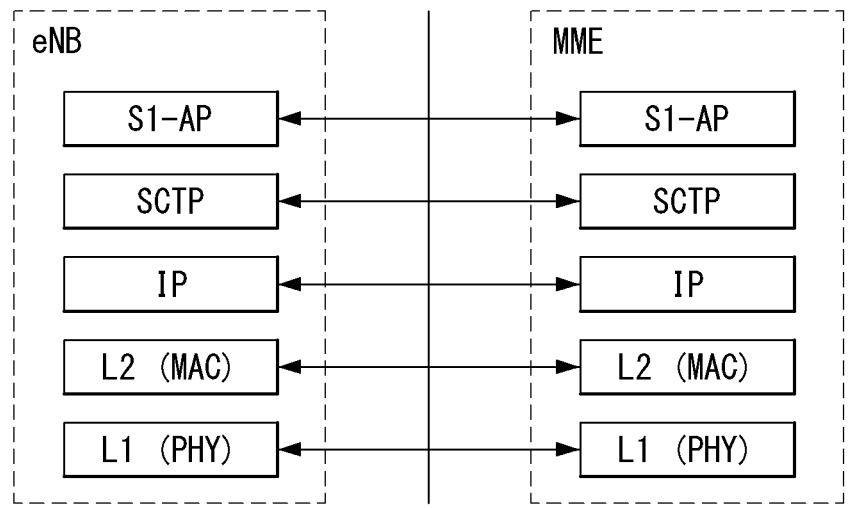
S1-MME
(a) Control-plane protocol stack
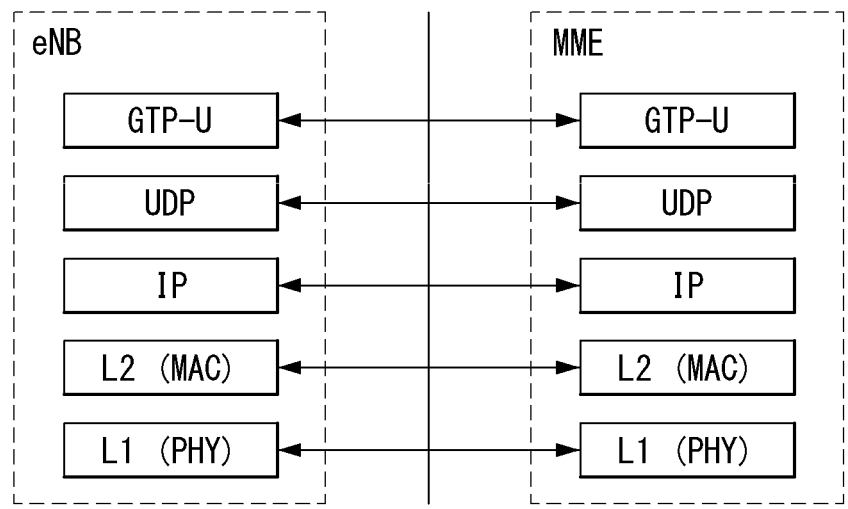
S1-U
(b) User-plane protocol stack

[FIG. 4]
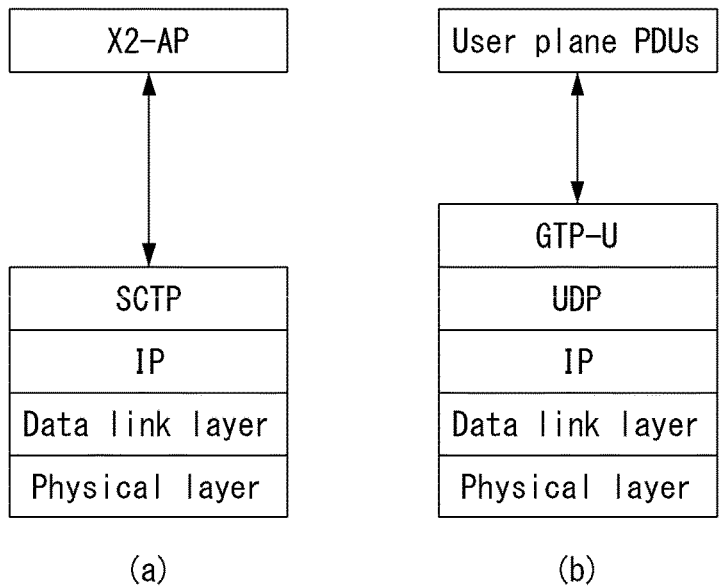
[FIG. 5]
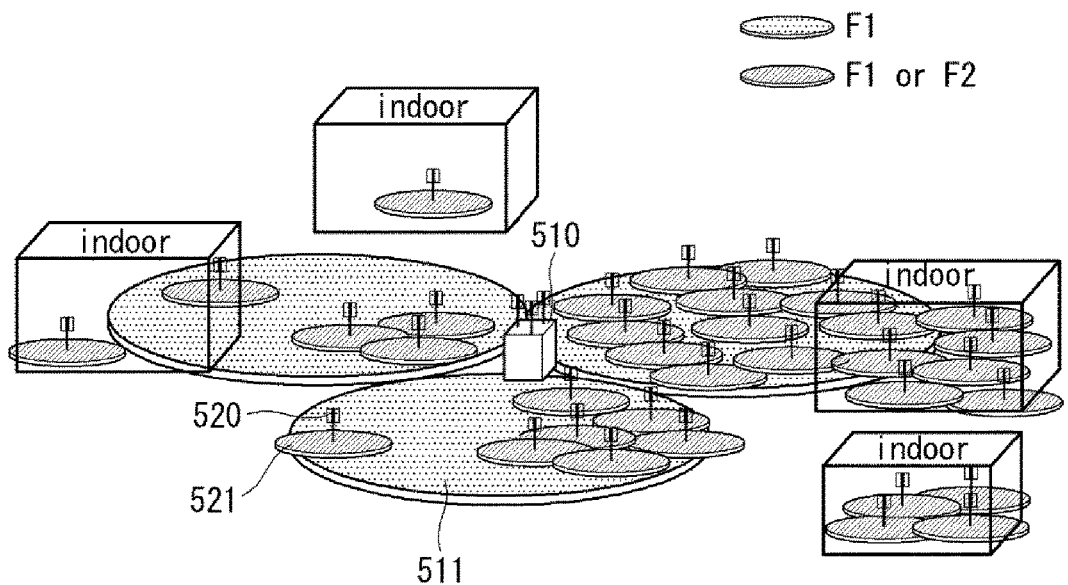

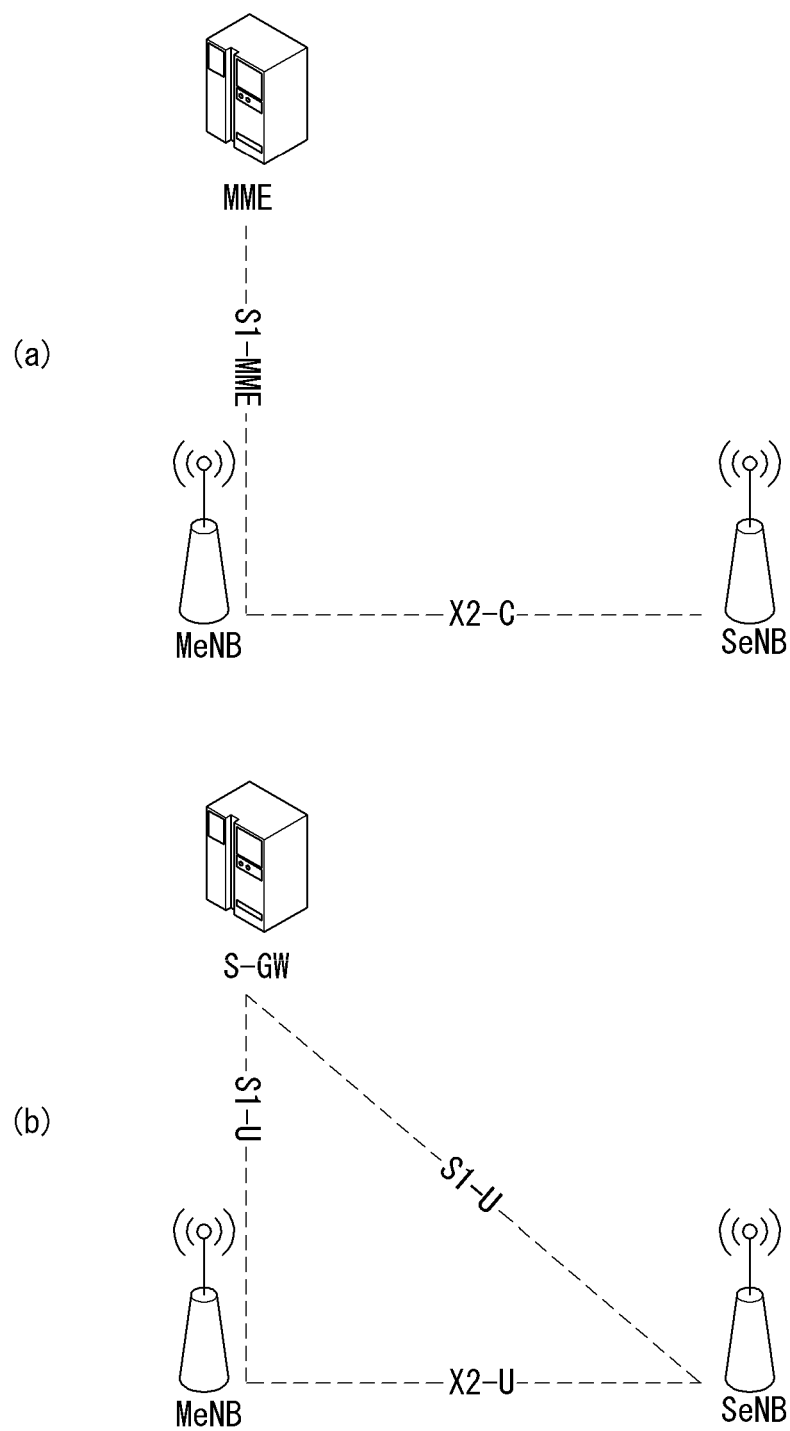
[FIG. 6]

[FIG. 7]
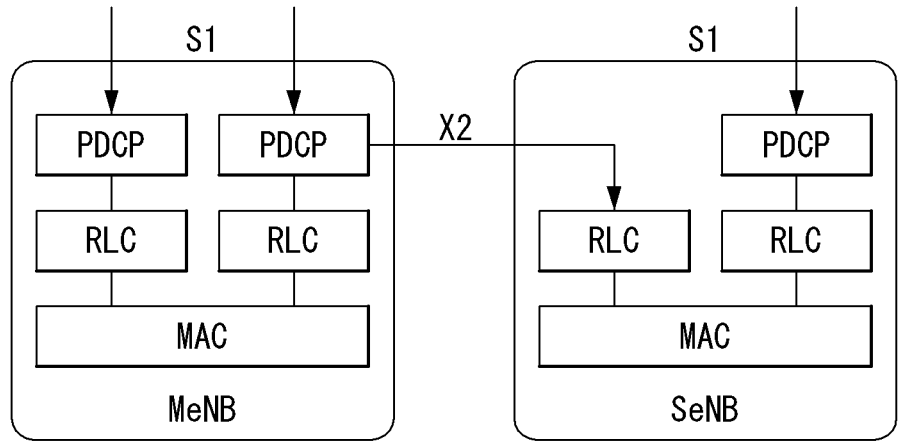
[FIG. 8]
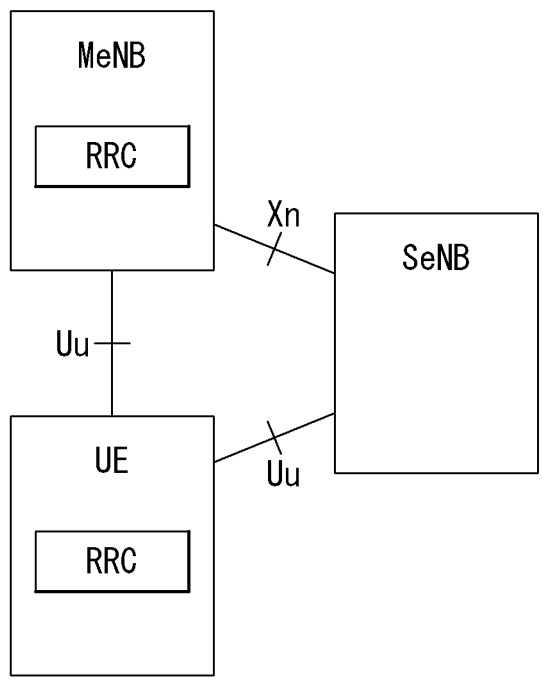

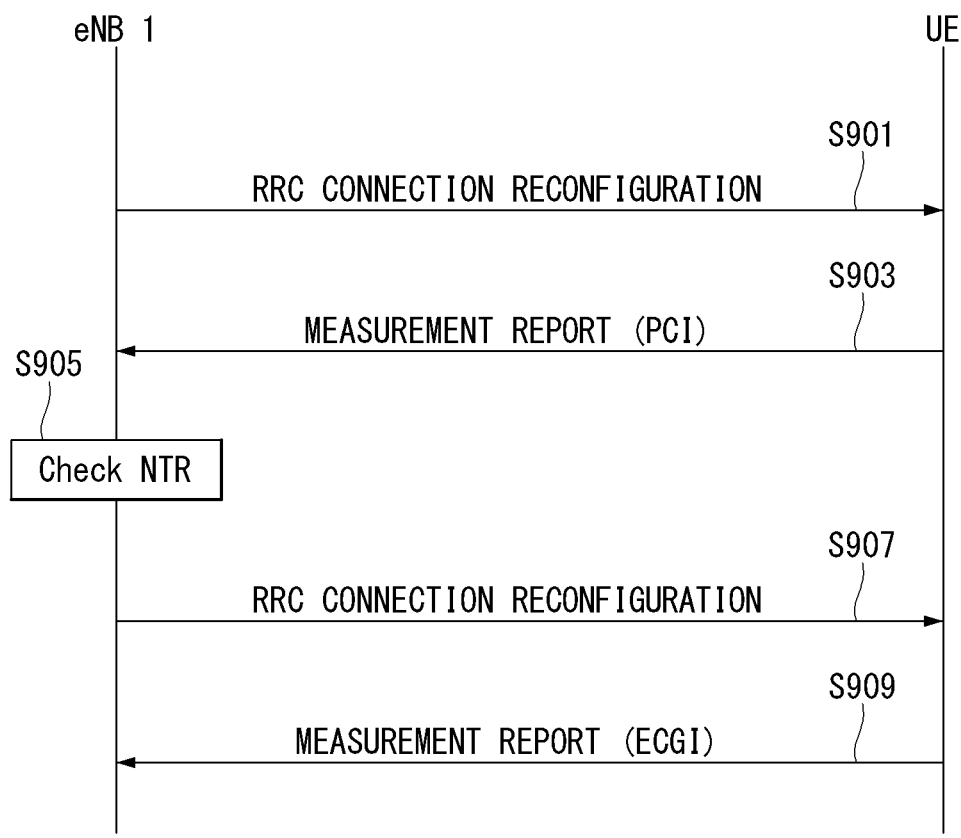

[FIG. 10]
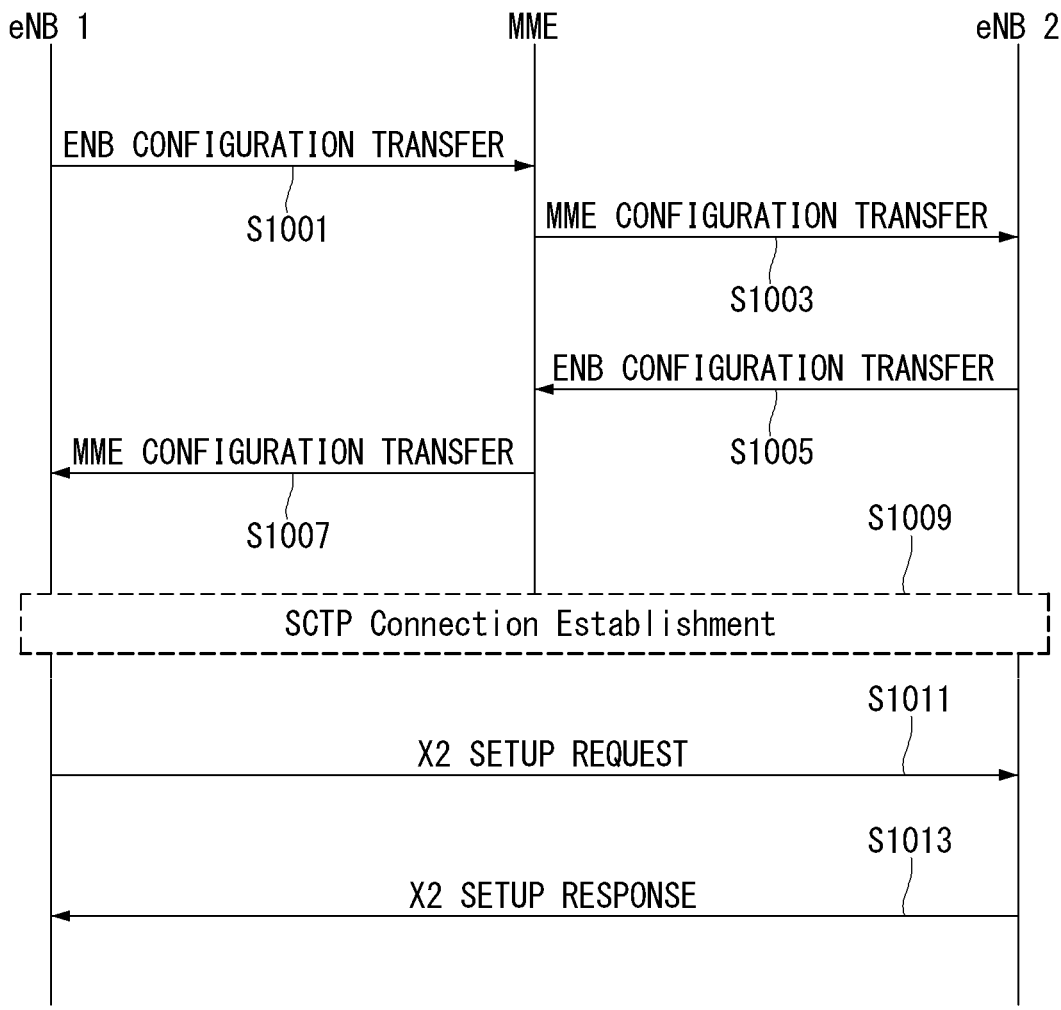
[FIG. 11]
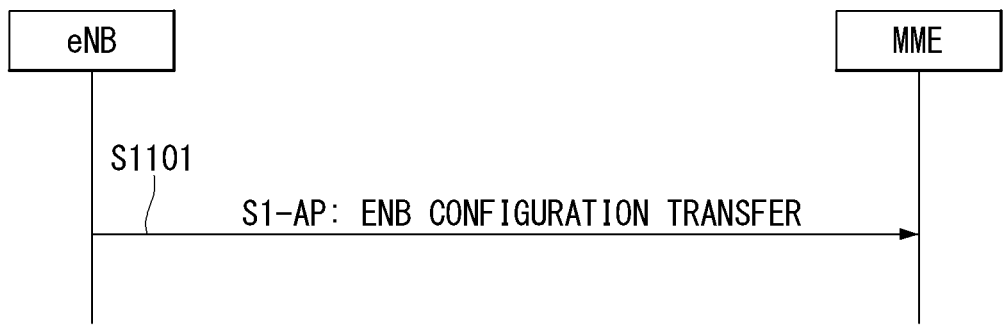

[FIG. 12]
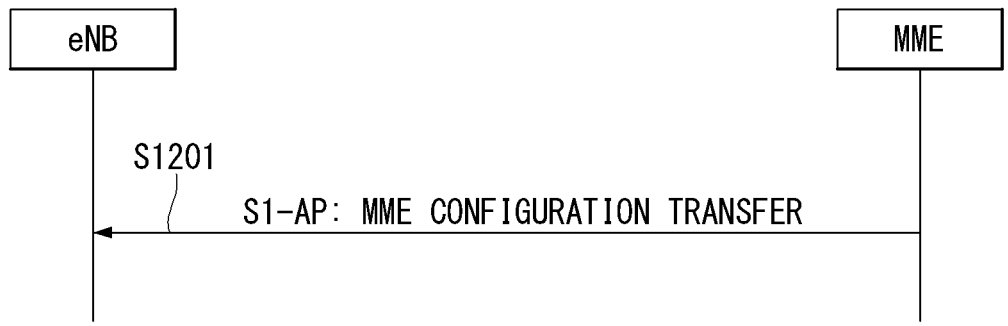
[FIG. 13]
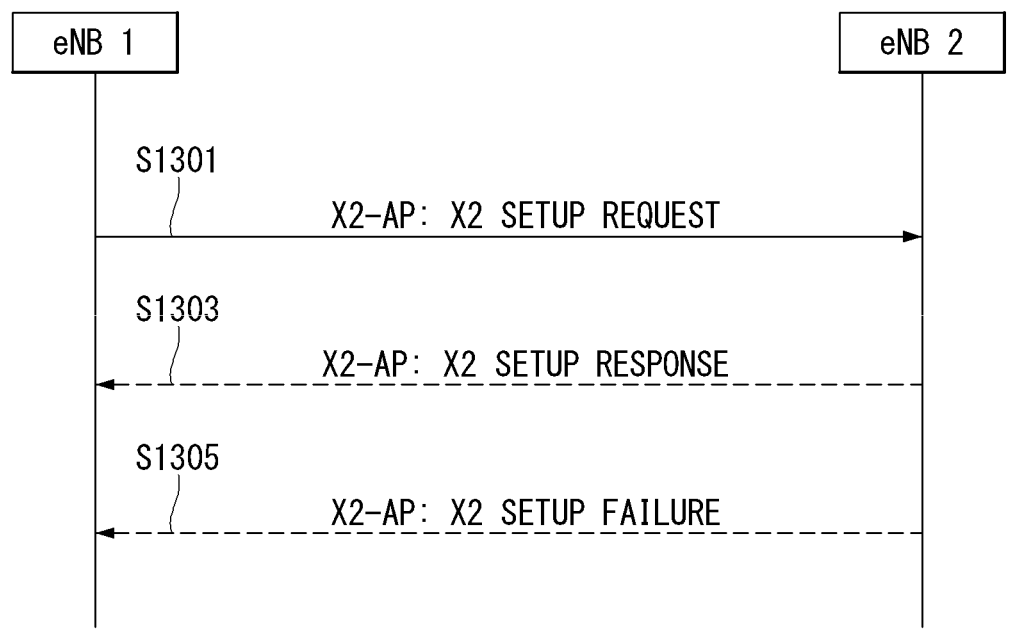

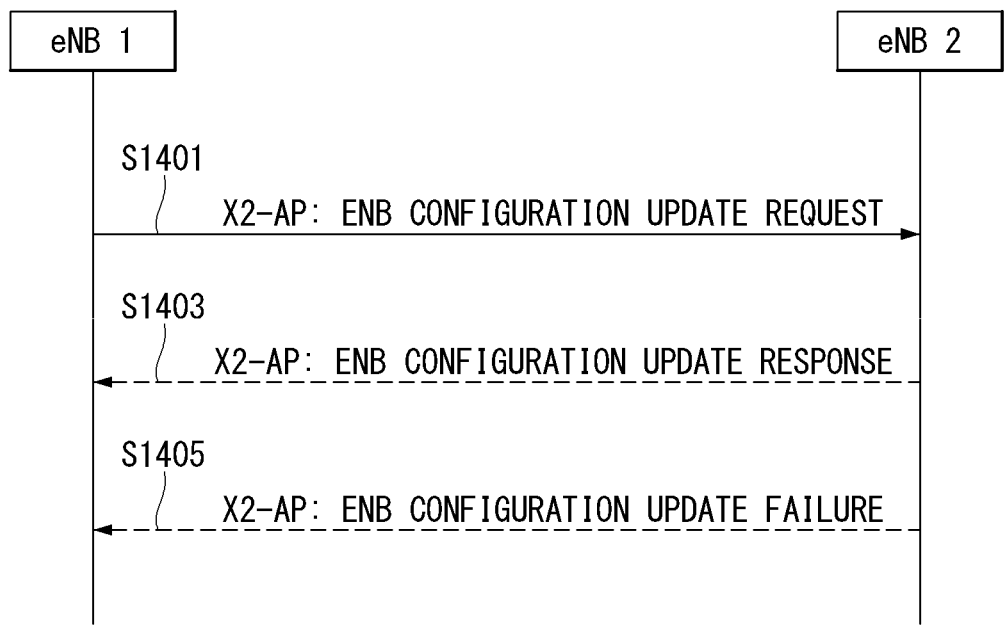
[FIG. 14]

[FIG. 15]
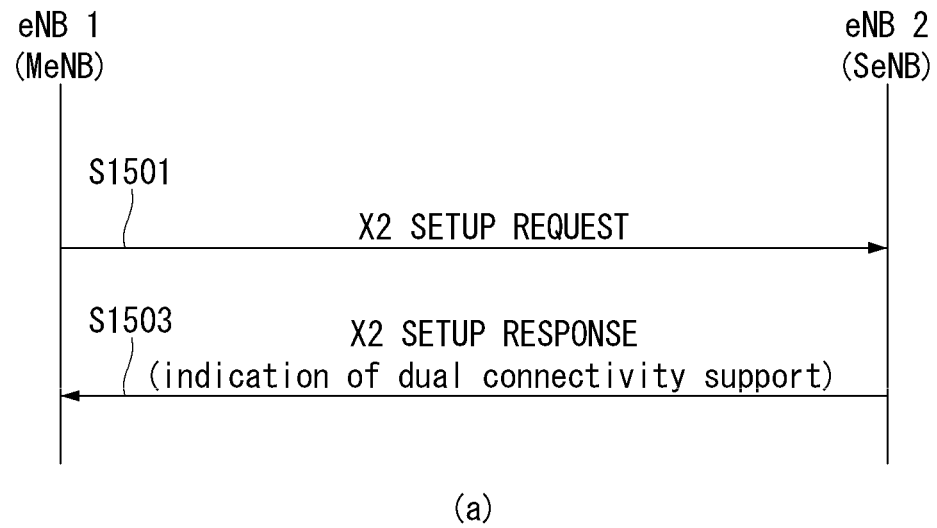
(a)
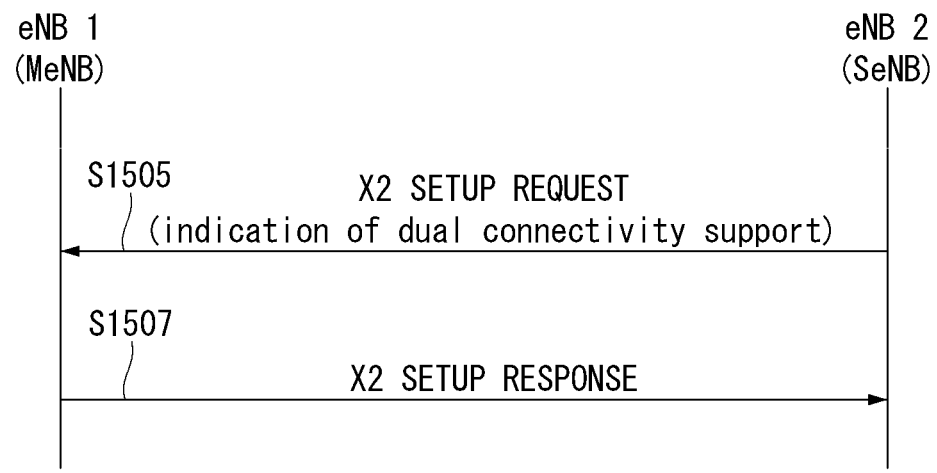
(b)

[FIG. 16]
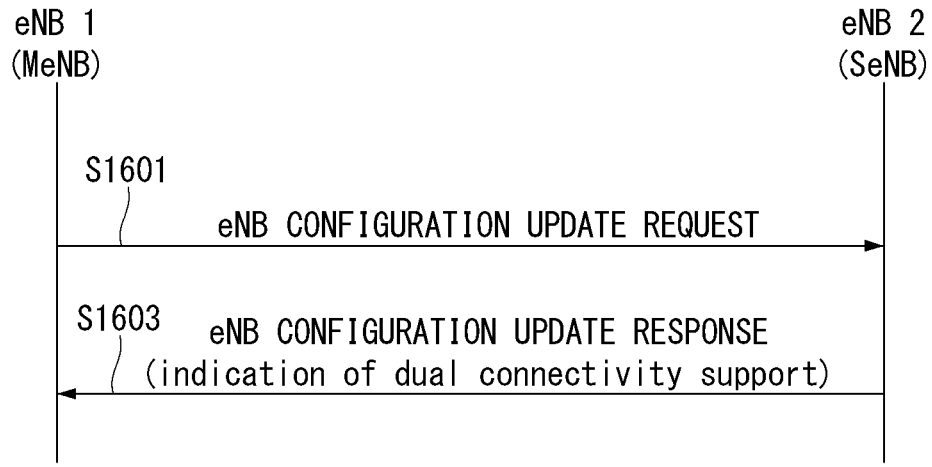
(a)
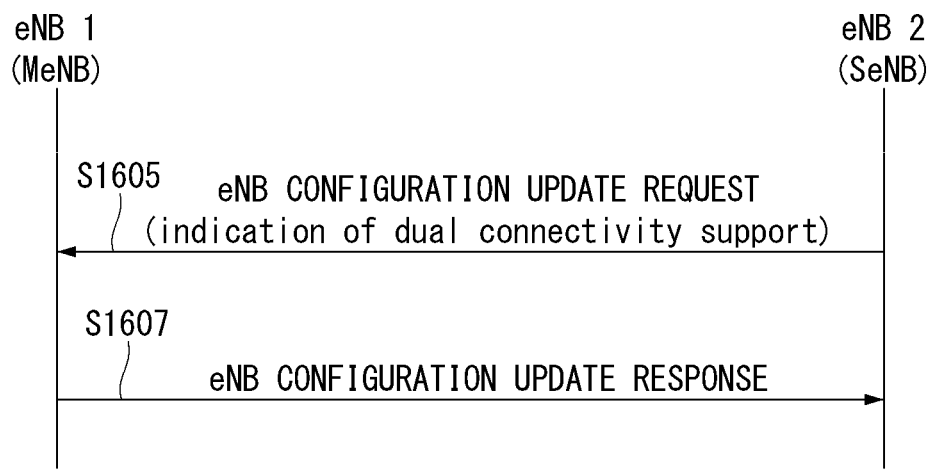
(b)

[FIG. 17]
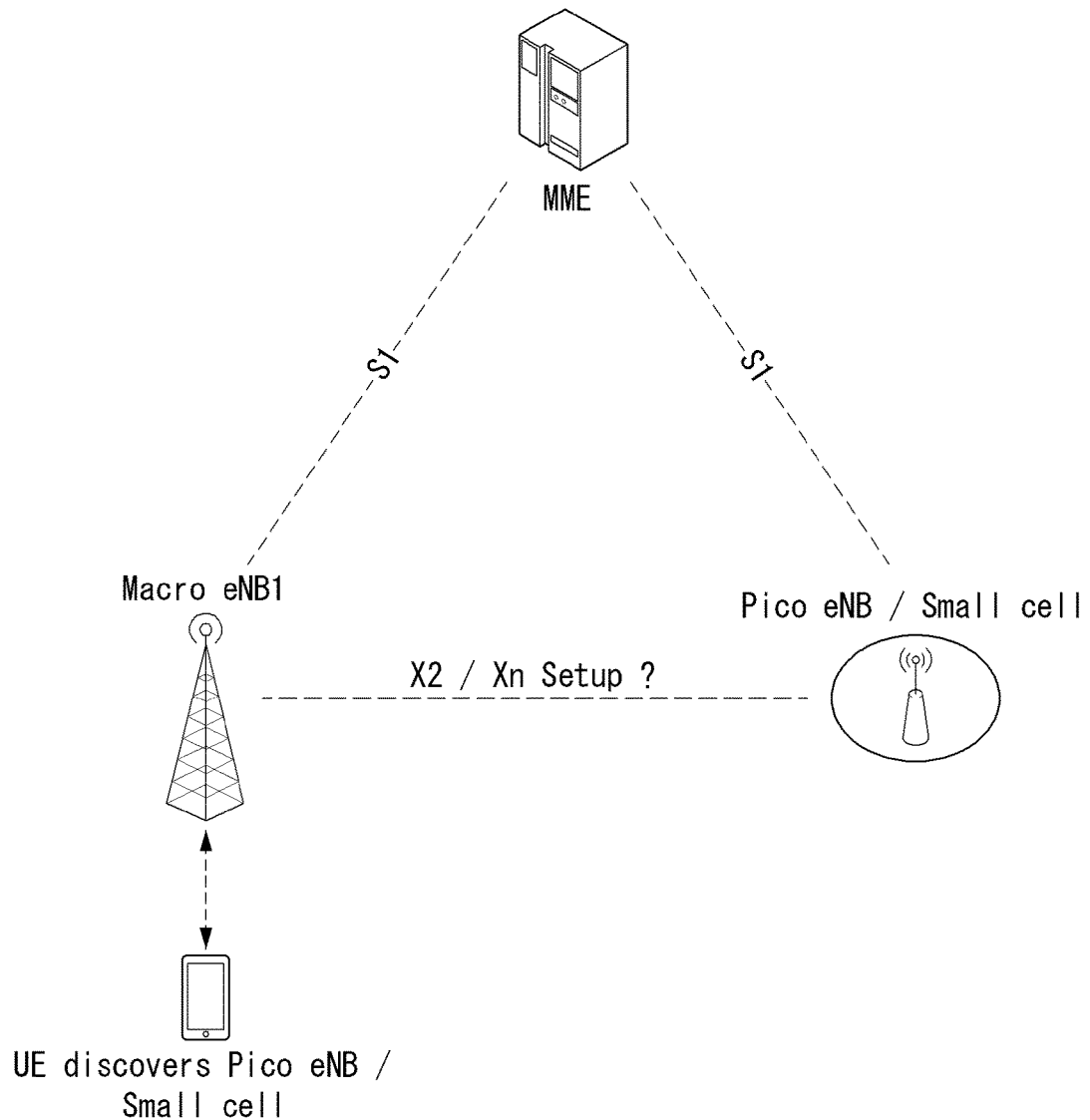

[FIG. 18]
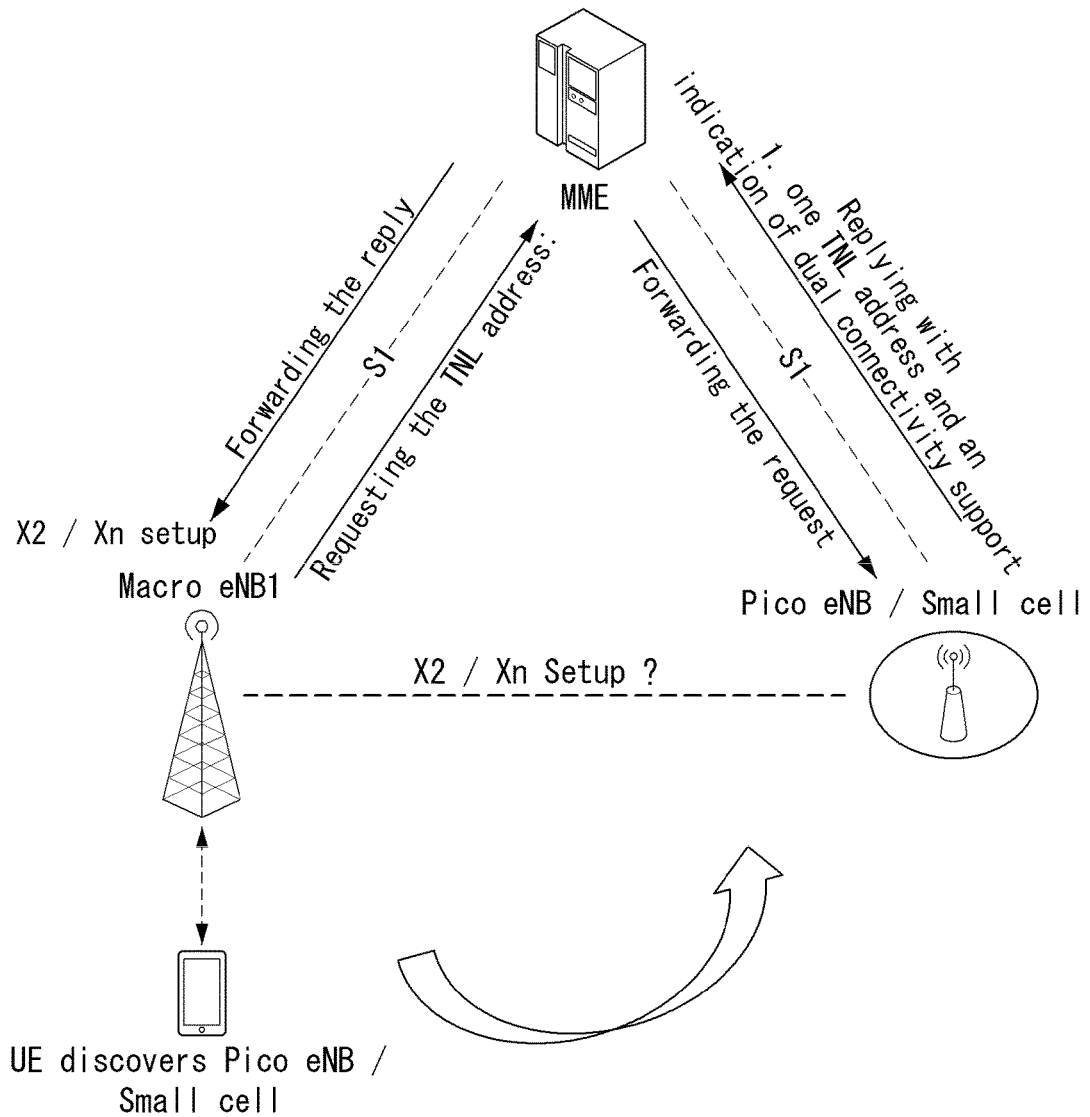

[FIG. 19]
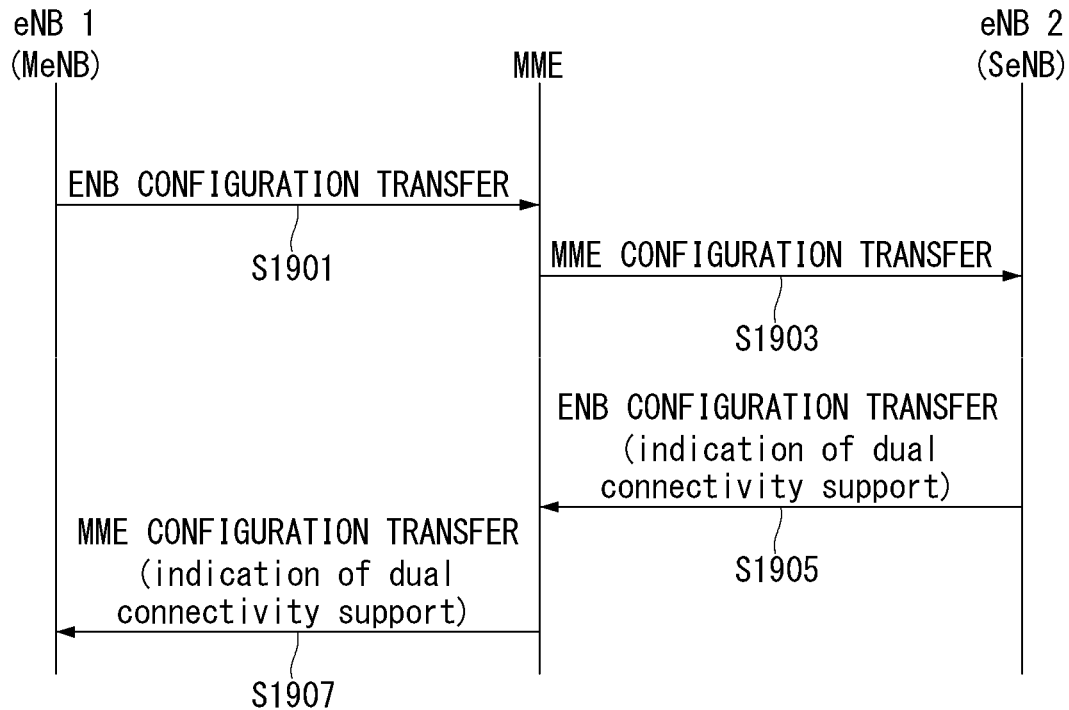
[FIG. 20]
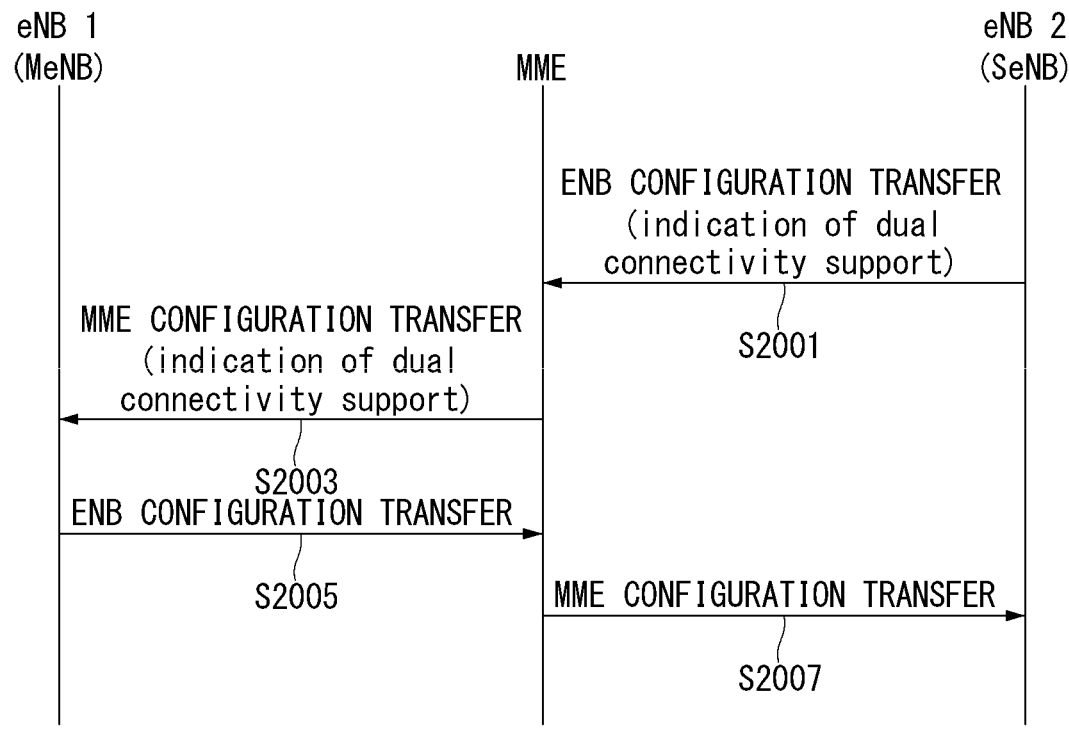

[FIG. 21]
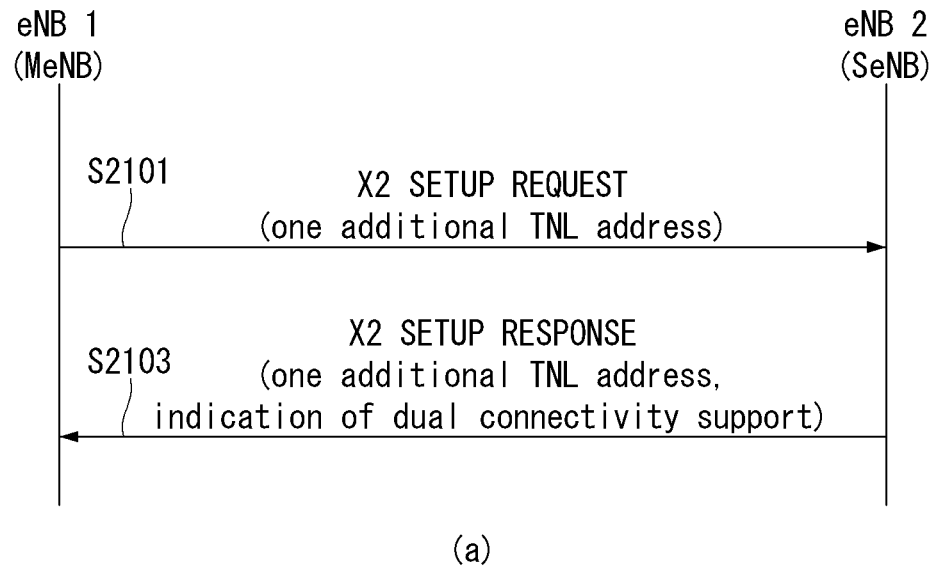
(a)
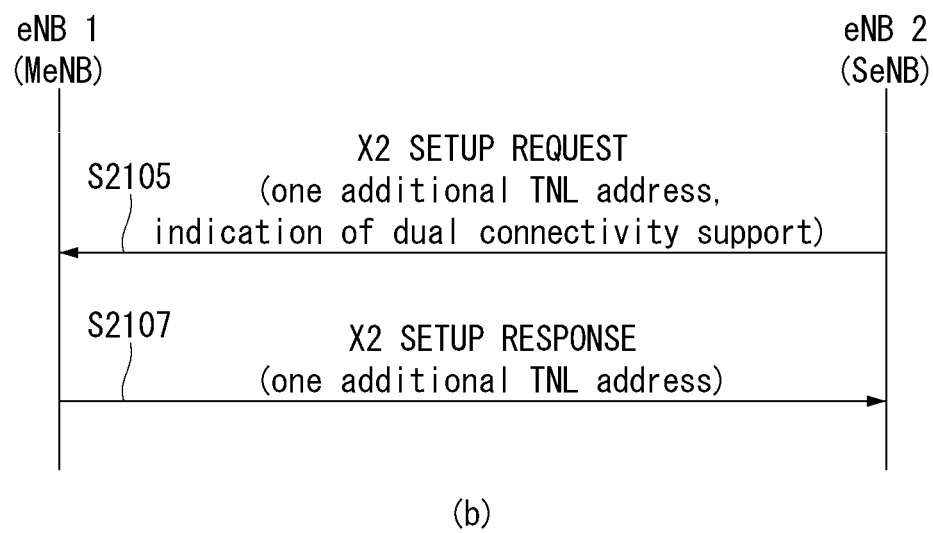
(b)

[FIG. 22]
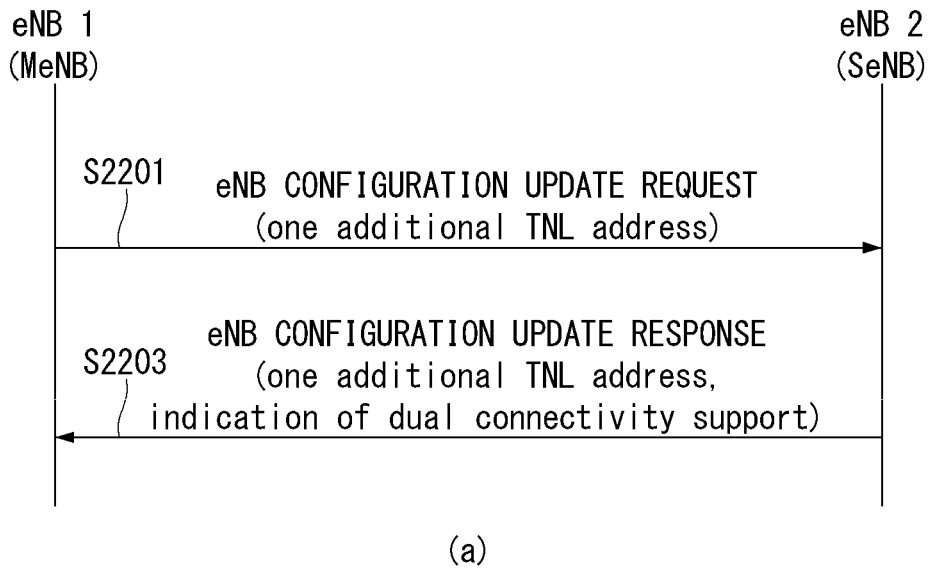
(a)
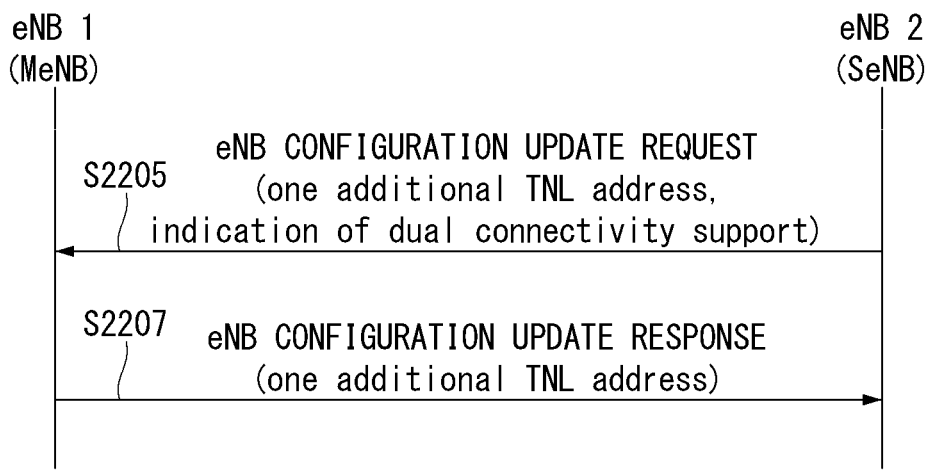
(b)

[FIG. 23]
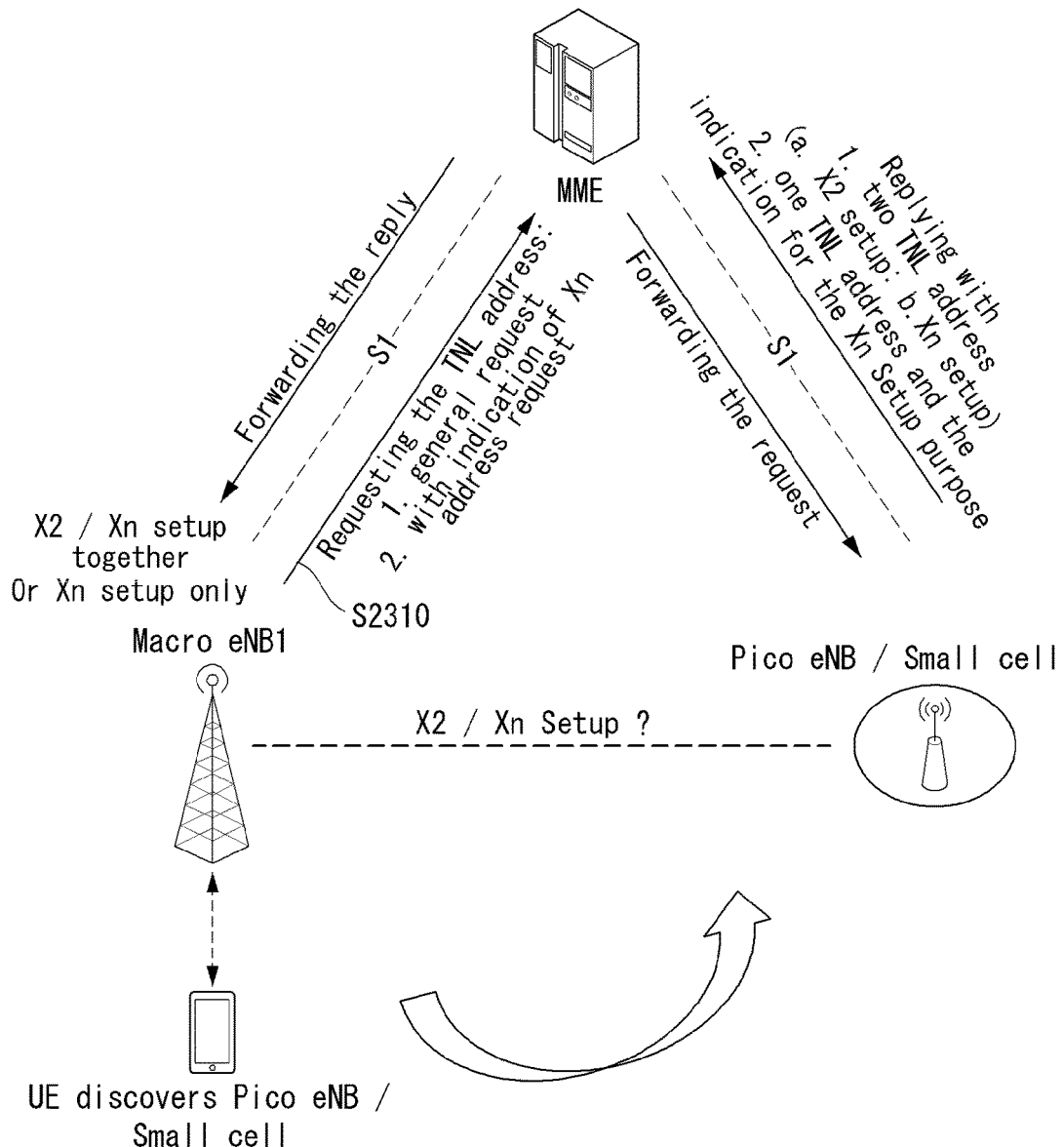

[FIG. 24]
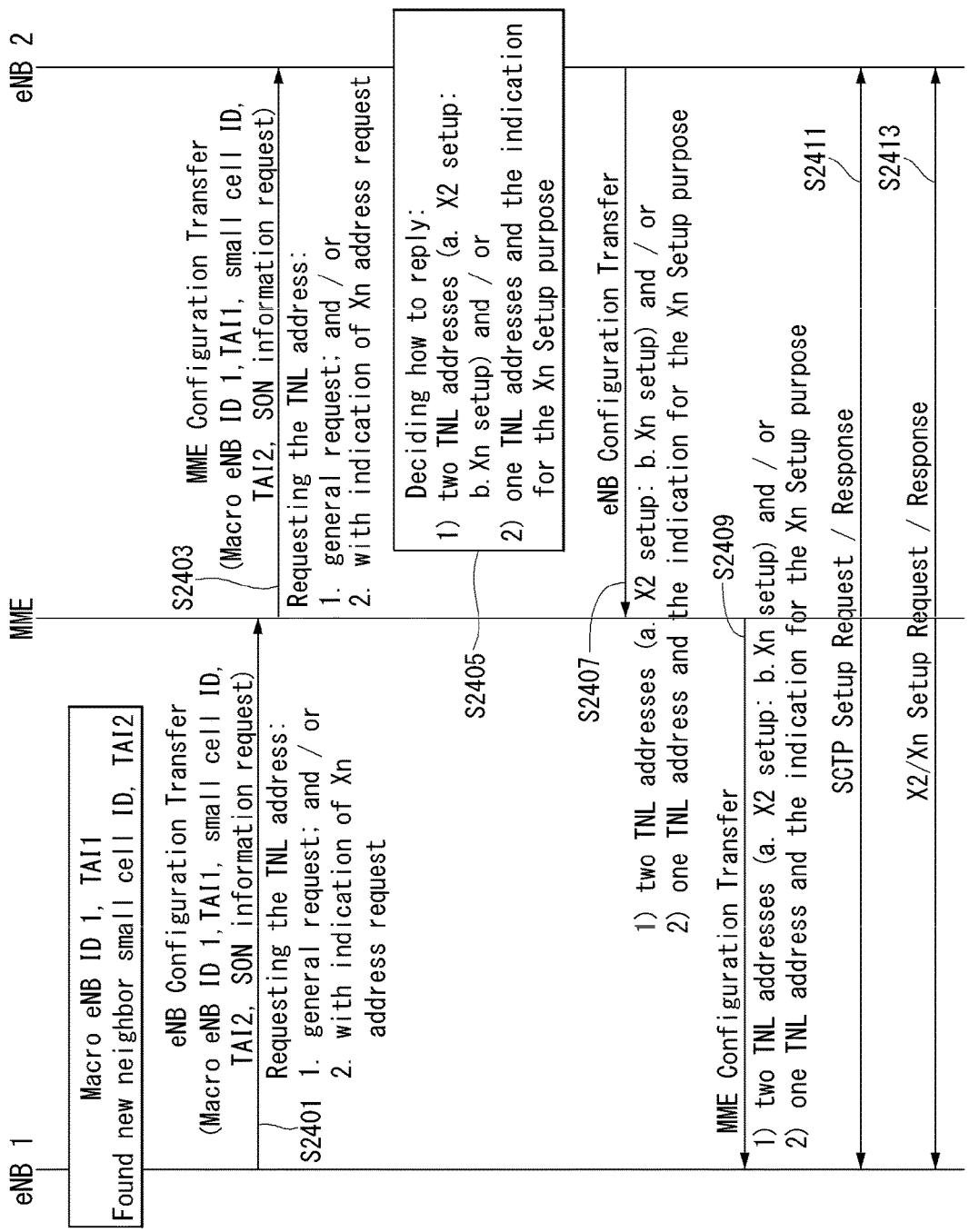

[FIG. 25]
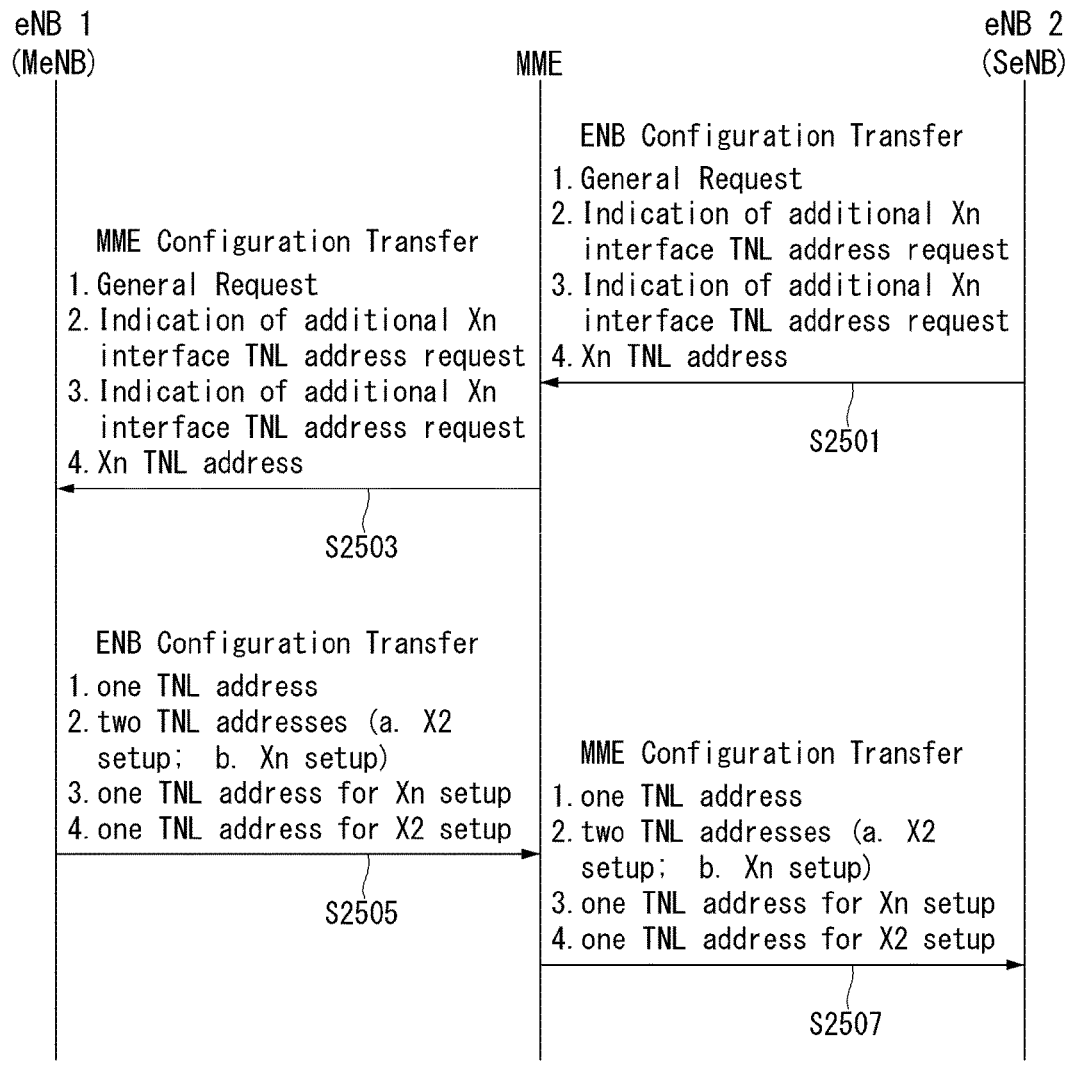
[FIG. 26]
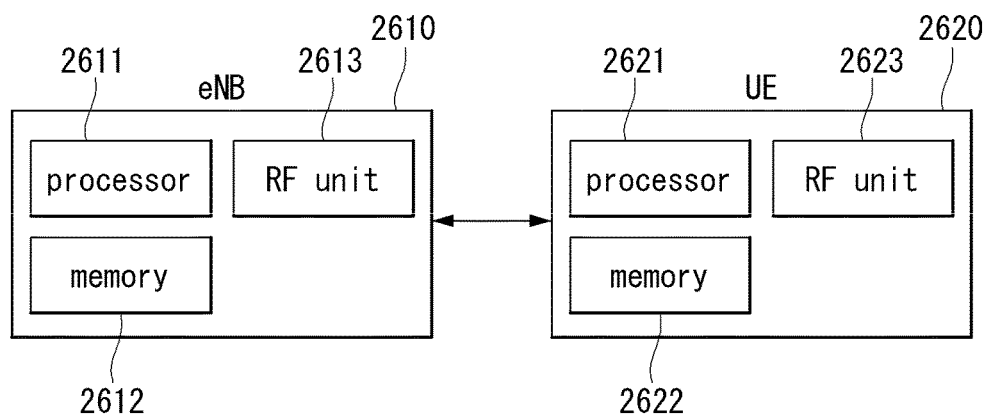

METHOD AND APPARATUS FOR SIGNALING BETWEEN ENBS IN A WIRELESS COMMUNICATION SYSTEM SUPPORTING DUAL CONNECTIVITY

This application is a 35 USC § 371 National Stage entry of International Application No. PCT/KR2014/008956, filed on Sep. 25, 2014, and claims priority to U.S. Provisional Application Nos. 61/882,639, filed Sep. 26, 2013, all of which are incorporated by reference in their entirety herein.

TECHNICAL FIELD

The present invention relates to a wireless communication, more particularly, to a method and an apparatus for direct or indirect signaling between eNBs in a wireless communication system.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide an enhanced network operation efficiently supporting dual connectivity of a user equipment (UE) in a wireless communication system.

Another object of the present invention is to provide an enhanced direct or indirect signaling procedure among eNBs to support efficiently dual connectivity of a UE.

The technical problems solved by the present invention are not limited to the above technical problems and those skilled in the art may understand other technical problems from the following description.

Technical Solution

In an aspect of the present invention, a method for signaling between eNBs in a wireless communication system that support Dual Connectivity, the method may include transmitting, by a first eNB, information indicating whether the first eNB supports the Dual Connectivity function to a second eNB, and transmitting and receiving, by the first eNB, signaling for the Dual Connectivity with the second eNB, if the first eNB supports the Dual Connectivity.

Preferably, the information may be transmitted through X2 SETUP REQUEST message.

Preferably, the first eNB may receive X2 SETUP REQUEST message from the second eNB, and the information is transmitted through X2 SETUP RESPONSE message.

Preferably, the information may be transmitted through eNB CONFIGURATION UPDATE REQUEST message.

Preferably, the first eNB may receive eNB CONFIGURATION UPDATE REQUEST message from the second eNB, and the information may be transmitted through eNB CONFIGURATION UPDATE RESPONSE message.

Preferably, the Dual Connectivity function may support secondary cell group (SCG) bearer option, or split bearer option, or both SCG bearer option and split bearer option.

In another aspect of the present invention, a method for signaling between eNBs in a wireless communication system that support Dual Connectivity, the method may include transmitting, by a first eNB, information indicating whether the first eNB supports the Dual Connectivity function to a MME (Mobility Management Entity), wherein the information is transferred to a second eNB by the MME and transmitting and receiving, by the first eNB, signaling for the Dual Connectivity with the second eNB, if the first eNB supports the Dual Connectivity.

Preferably, the information may be transmitted through ENB CONFIGURATION TRANSFER message to the MME.

Preferably, the first eNB may receive MME CONFIGURATION TRANSFER message from the MME, and the information may be transmitted through ENB CONFIGURATION TRANSFER message to the MME in response to the MME CONFIGURATION TRANSFER message.

Preferably, the Dual Connectivity function may support secondary cell group (SCG) bearer option, or split bearer option, or both SCG bearer option and split bearer option.

Advantageous Effects

According to embodiments of the present invention, by defining the method for direct or indirect signaling between eNBs for supporting dual connectivity of a user equipment, it is available to effectively provide the dual connectivity for the user equipment in a wireless communication system where a great many small cell eNBs is distributed.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a schematic structure a network structure of an evolved universal mobile telecommunication system (E-UMTS) to which the present invention can be applied;

FIG. 2 illustrates architecture of a typical E-UTRAN and a typical EPC to which the present invention can be applied;

FIG. 3 illustrates the configurations of a control plane and a user plane of an interface protocol between the eNB and the MME in the wireless communication system to which the present invention can be applied;

FIG. 4 illustrates the configurations of a control plane and a user plane protocol of an X2 interface in the wireless communication system to which the present invention can be applied;

FIG. 5 is a view schematically illustrating a small cell deployment scenario in the wireless communication system to which the present invention can be applied;

FIG. 6 illustrates network interfaces for Dual Connectivity in the wireless communication system to which the present invention can be applied;

FIG. 7 illustrates architecture of radio interface protocol for Dual Connectivity function, which includes split bearer option and/or SCG bearer option, between the Network and a UE in the wireless communication system to which the present invention can be applied;

FIG. 8 illustrates Control plane architecture for Dual Connectivity in the wireless communication system to which the present invention can be applied;

FIG. 9 illustrates ANR function in the wireless communication system to which the present invention can be applied;

FIG. 10 illustrates X2 connection establishment in the wireless communication system to which the present invention can be applied;

FIG. 11 illustrates eNB Configuration Transfer procedure in the wireless communication system to which the present invention can be applied;

FIG. 12 illustrates MME Configuration Transfer procedure in the wireless communication system to which the present invention can be applied;

FIG. 13 illustrates X2 setup procedure in the wireless communication system to which the present invention can be applied;

FIG. 14 illustrates eNB Configuration Update procedure in the wireless communication system to which the present invention can be applied;

FIG. 15 is a drawing exemplifying the X2 Setup procedure according to an embodiment of the present invention.

FIG. 16 is a drawing exemplifying the eNB configuration update procedure according to an embodiment of the present invention.

FIG. 17 is a drawing exemplifying the network architecture including the small cell according to an embodiment of the present invention.

FIG. 18 is a drawing conceptually illustrating the TNL address discovery according to an embodiment of the present invention.

FIG. 19 is a drawing exemplifying the TNL address discovery procedure according to an embodiment of the present invention.

FIG. 20 is a drawing exemplifying the TNL address discovery procedure according to an embodiment of the present invention.

FIG. 21 is a drawing exemplifying the X2 Setup procedure according to an embodiment of the present invention.

FIG. 22 is a drawing exemplifying the eNB configuration update procedure according to an embodiment of the present invention.

FIG. 23 is a drawing conceptually illustrating the TNL address discovery according to an embodiment of the present invention.

FIG. 24 is a drawing exemplifying the TNL address discovery procedure according to an embodiment of the present invention.

FIG. 25 is a drawing exemplifying the TNL address discovery procedure according to an embodiment of the present invention.

FIG. 26 is a block diagram of a wireless communication apparatus according to an embodiment of the present invention.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS)', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates architecture of a typical E-UTRAN and a typical EPC to which the present invention can be applied.

Referring to the FIG. 2, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as stated above, the gateway may perform functions of paging origination, LTE_IDLE state management, ciphering of the user plane, System Architecture Evolution (SAE) bearer control, and ciphering and integrity protection of NAS signaling.

FIG. 3 illustrates the configurations of a control plane and a user plane of an interface protocol between the eNB and the MME in the wireless communication system to which the present invention can be applied.

FIG. 3(a) shows the respective layers of the control plane protocol stack on the S1 interface, and FIG. 3(b) shows the respective layers of the user plane protocol stack on the S1 interface.

The S1 control plane interface (S1-MME) is defined between the eNB and the MME. The transport network layer is built on IP transport, similarly to the user plane but for the reliable transport of signalling messages SCTP (Stream Control Transmission Protocol) is added on top of IP. The application layer signalling protocol is referred to as S1-AP (S1 Application Protocol).

The SCTP layer provides the guaranteed delivery of application layer messages.

In the transport IP layer point-to-point transmission is used to deliver the signalling PDUs.

A single SCTP association per S1-MME interface instance shall be used with one pair of stream identifiers for S1-MME common procedures. Only a few pairs of stream identifiers should be used for S1-MME dedicated procedures. MME communication context identifiers that are assigned by the MME for S1-MME dedicated procedures and eNB communication context identifiers that are assigned by the eNB for S1-MME dedicated procedures shall be used to distinguish UE specific S1-MME signalling transport bearers. The communication context identifiers are conveyed in the respective S1-AP messages.

If the S1 signalling transport layer notifies the S1AP layer that the signalling connection broke:
the MME locally changes the state of the UEs which used this signalling connection to the ECM-IDLE;
the eNB releases the RRC connection with those UEs.

RNs (Relay Nodes) terminate S1-AP. In this case, there is one S1 interface relation between the RN and the DeNB (Donor eNB), and one S1 interface relation between the DeNB and each of the MMEs in the MME pool. The S1 interface relation between the RN and the DeNB carries non-UE-associated S1-AP signalling between RN and DeNB and UE-associated S1-AP signalling for UEs connected to the RN. The S1 interface relation between the DeNB and an MME carries non-UE-associated S1-AP signalling between DeNB and MME and UE-associated S1-AP signalling for UEs connected to the RN and for UEs connected to the DeNB.

The S1 user plane interface (S1-U) is defined between the eNB and the S-GW. The S1-U interface provides non guaranteed delivery of user plane PDUs between the eNB and the S-GW. The transport network layer is built on IP transport and GTP-U is used on top of UDP/IP to carry the user plane PDUs between the eNB and the S-GW.

FIG. 4 illustrates the configurations of a control plane and a user plane protocol of an X2 interface in the wireless communication system to which the present invention can be applied.

FIG. 4(a) shows the control plane protocol stack on the X2 interface, and FIG. 4(b) shows the user plane protocol stack on the X2 interface.

Referring to the FIG. 4(a), the X2 control plane interface (X2-CP) is defined between two neighbor eNBs. The transport network layer is built on SCTP on top of IP (Internet Protocol). The application layer signaling protocol is referred to as X2-AP (X2 Application Protocol).

A single SCTP association per X2-C interface instance shall be used with one pair of stream identifiers for X2-C common procedures. Only a few pairs of stream identifiers should be used for X2-C dedicated procedures.

Source-eNB communication context identifiers that are assigned by the source-eNB for X2-C dedicated procedures, and target-eNB communication context identifiers that are assigned by the target-eNB for X2-C dedicated procedures, shall be used to distinguish UE specific X2-C signalling transport bearers. The communication context identifiers are conveyed in the respective X2AP messages.

RNs terminate X2-AP. In this case, there is one X2 interface relation between the RN and the DeNB.

The X2AP protocol supports the following functions:
Intra LTE-Access-System Mobility Support for UE in ECM-CONNECTED (Context transfer from source eNB to target eNB, Control of user plane tunnels between source eNB and target eNB, Handover cancellation)
Support of Dual Connectivity for UE in ECM-CONNECTED (Establishment, Modification and Release of a UE context at the SeNB, Control of user plane tunnels between MeNB and SeNB for a specific UE for split bearer and data forwarding, Provision of the transport network layer (TNL) information of the S1 user plane tunnels for SCG bearers)
Load Management
General X2 management and error handling functions (Error indication, Setting up the X2, Resetting the X2, Updating the X2 configuration data)
Mobility failure event notification and information exchange in support of handover settings negotiation
Energy Saving. This function allows decreasing energy consumption by enabling indication of cell activation/deactivation Referring to the FIG. 4(b), the X2 user plane interface (X2-U) is defined between eNBs. The LTE X2-U protocol tunnels end-user packets between eNBs. The tunneling function supports the identification of packets with the tunnels and packet loss management. The X2-U interface provides non guaranteed delivery of user plane packet data units (PDUs). The transport network layer is built on IP transport and GTP-U is used on top of UDP (user datagram protocol) or IP to carry the user plane PDUs. The X2-UP interface protocol stack is identical to the S1-UP protocol stack. Thus, protocol processing for the eNB at the time of data forwarding can be minimized.

Small Cell Enhancement

In order to accommodate explosively increasing data traffic, research into a small cell enhancement technique to cover a relatively small area using small amount of power, relative to an existing macro cell, has been actively conducted.

Small cell enhancement refers to a technique of densely disposing small cells within macro cell coverage (or without macro cell coverage in case of the interior of a building, or the like) and maximizing spectrum efficiency per unit area through close cooperation between a macro cell eNB and a small cell eNB or between small cell eNBs to enable effective mobility management, while accommodating explosively increasing traffic. In particular, there is huge communication demand in a particular area such as a so-called hot spot within a cell, and receive sensitivity of propagation may be degraded in a particular area such as a cell edge or a coverage hole, and thus, a small cell may be used in a communication shadow area not covered by only a macro cell or an area, such as a hot spot, in which a large amount of data services is requested.

A macro cell eNB may also be called macro eNB (MeNB), and a small cell eNB may also be called small eNB, secondary eNB (SeNB), pico eNB, femto eNB, micro eNB, a remote radio head (RRH), a relay, a repeater, or the like. In this manner, a network in which macro cells and small cells coexist is called a heterogeneous network (HetNet).

FIG. 5 is a view schematically illustrating a small cell deployment scenario in the wireless communication system to which the present invention can be applied.

Referring to FIG. 5, an MeNB 510 provides a wireless communication environment to a UE within coverage of a macro cell area 511, and an SeNB 520 provides a wireless communication environment to a UE within coverage of a small cell area 521.

As illustrated in FIG. 5, coverage of the macro cell area 511 and coverage of the small cell region 521 may overlap or may not, and a carrier frequency F1 supported by the MeNB 510 and a carrier frequency supported by the SeNB 520 may be identical (when the SeNB supports F1) or may not (when the SeNB supports F2). Both ideal backhaul and non-ideal backhaul may be supported between the MeNB and the SeNB or between a plurality of SeNBs. Also, both a dense or sparse small cell deployment may be considered and both indoor and outdoor small cell deployment may be considered. In FIG. 5, the macro cell area 511 and the small cell area 521 are merely illustrative, and different numbers or sizes of the macro cell areas and the small cell areas may be deployed.

Small cell enhancement considers all of various scenarios as described above with respect to the small cell deployment. This will be described in detail hereinafter.

With and without Macro Coverage

Small cell enhancement considers both with and without macro coverage. More specifically, Small cell enhancement is considered the deployment scenario in which small cell nodes are deployed under the coverage of one or more than one overlaid E-UTRAN macro-cell layer(s) in order to boost the capacity of already deployed cellular network. Two scenarios can be considered in the deployment scenario with macro coverage, where the UE is in coverage of both the macro cell and the small cell simultaneously and where the UE is not in coverage of both the macro cell and the small cell simultaneously. Also, Small cell enhancement is considered the deployment scenario where small cell nodes are not deployed under the coverage of one or more overlaid E-UTRAN macro-cell layer(s).

Outdoor and Indoor

Small cell enhancement considers both outdoor and indoor small cell deployments. The small cell nodes could be deployed indoors or outdoors, and in either case could provide service to indoor or outdoor UEs. For indoor UE, only low UE speed (i.e., 0-3 km/h) can be considered. On the contrary, for outdoor, not only low UE speed, but also medium UE speed (i.e., up to 30 km/h and potentially higher speeds) should be considered.

Both throughput and mobility/connectivity shall be used as performance metric for both low and medium mobility. Cell edge performance (e.g. 5%-tile CDF (Cumulative Distribution Function) point for user throughput) and power efficiency (of both network and UE) are also used as metric.

Ideal and Non-ideal Backhaul

Small cell enhancement considers both ideal backhaul (i.e., very high throughput and very low latency backhaul such as dedicated point-to-point connection using optical fiber, LOS (line of sight) microwave) and non-ideal backhaul (i.e., typical backhaul widely used in the market such as xDSL, NLOS (non-LOS) microwave, and other backhauls like relaying). The performance-cost trade-off should be taken into account.

Sparse and Dense

Small cell enhancement considers sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc.), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e. a small cell cluster.

Furthermore, smooth future extension/scalability (e.g.: from sparse to dense, from small-area dense to large-area dense, or from normal-dense to super-dense) is considered. For mobility/connectivity performance, both sparse and dense deployments are considered with equal priority.

Synchronization

Both synchronized and un-synchronized scenarios are considered between small cells as well as between small cells and macro cell(s). For specific operations e.g., interference coordination, carrier aggregation (CA) and inter-eNB COMP, small cell enhancement can benefit from synchronized deployments with respect to small cell search/measurements and interference/resource management.

Spectrum

Small cell enhancement addresses the deployment scenario in which different frequency bands are separately assigned to macro layer and small cell layer, respectively. Small cell enhancement can be applicable to all existing and as well as future cellular bands, with special focus on higher frequency bands, e.g., the 3.5 GHz band, to enjoy the more available spectrum and wider bandwidth. Small cell enhancement can also take into account the possibility for frequency bands that, at least locally, are only used for small cell deployments.

Co-channel deployment scenarios between macro layer and small cell layer should be considered as well. Some example spectrum configurations can be considered as follow.

Carrier aggregation on the macro layer with bands X and Y, and only band X on the small cell layer Small cells supporting carrier aggregation bands that are co-channel with the macro layer Small cells supporting carrier aggregation bands that are not co-channel with the macro layer.

Small cell enhancement should be supported irrespective of duplex schemes (FDD/TDD) for the frequency bands for macro layer and small cell layer. Air interface and solutions for small cell enhancement should be band-independent.

Traffic

In a small cell deployment, it is likely that the traffic is fluctuating greatly since the number of users per small cell node is typically not so large due to small coverage. In a small cell deployment, it is likely that the user distribution is very fluctuating between the small cell nodes. It is also expected that the traffic could be highly asymmetrical, either downlink or uplink centric. Thus, both uniform and non-uniform traffic load distribution in time-domain and spatial-domain are considered.

Deployment-related Requirements

Deployment use cases—Operator deployed scenario (i.e. the operator performs cell planning and installs/maintains small cell nodes) should be supported for small cell enhancement. In contrast, User deployed scenarios, for example small cell nodes deployed in office buildings by organizational users, could be supported for small cell enhancement with a lower priority.

Automatic mechanisms such as plug-and-play provisioning to support flexible configuration and lower cost for operation and maintenance could be considered for both operator- and user-deployed scenarios, taking into account the possible absence of radio planning on these deployments.

Even in operator deployed scenario, the reduction in cell planning efforts compared to Releases 10/11 should be considered.

Co-existence and interworking—For small cell enhancement, the same inter-RAT interworking capabilities with at least the same performance as in 3GPP Release 10/11 E-UTRAN shall be supported assuming the small cells support the 3GPP Releases 10/11 mechanisms.

Core network aspects—Small cell enhancement should minimize signalling load (e.g., caused by mobility) to the core network as well as increase of backhaul traffic due to increasing number of small cell nodes.

Capability and Performance Requirements

The enhancements shall focus on cell capacity i.e. achievable user throughput and system throughput in typical coverage situations and with typical terminal configurations, including terminals with 2 RX antennas and supporting a single component carrier.

System performance—Small cell enhancement should support significantly increased user throughput for both downlink and uplink with main focus on typical user throughput (e.g. 50% and, for coverage limited scenarios, 5% point of CDF of the user throughput), given a reasonable system complexity. Actual quantitative requirements can be determined in succeeding study items on physical and higher layer enhancements.

Consistent user experience over the coverage area is highly desirable. Small cell enhancement should keep the fairness of the user throughput for both downlink and uplink in a scenario, where user distribution is dynamically changing.

Small cell enhancement should target the capacity per unit area (e.g. bps/km2) to be as high as possible, for a given user and small cell distribution, typical traffic types and considering a reasonable system complexity.

The small cell enhancements should evaluate the impact of the actual backhaul delays and provide solutions with the aim of improved system performance. Other aspects, for example service quality of Voice over LTE (VoLTE) (e.g. MOS score) and delay/jitter impacts on services (video streaming, video calls, etc.), could also be addressed in follow-on studies.

Mobility performance—Small cell enhancement should support mobility which is required for the deployment scenarios described above.

Small cell enhancement should support mobility which is required for the future spectrum use in higher frequency bands (e.g. more available spectrum and wider bandwidth).

Small cell enhancement should support mobility for flexible coverage conditions described below.

For UEs being served on a macro layer and for the targeted mobile speeds up to 30 km/h, small cell nodes need to be discovered, and potential mobility to small cell node performed, in a timely manner and with low UE power consumption in a situation when the UE moves into the coverage area of the small cell layer.

Mobility across densely deployed small cell nodes, and between macro and small cell on the same frequency layer, should be targeted with good performance for mobile speeds up to 30 km/h.

Mobility enhancements for higher speeds (e.g. 50-80 km/h) in small cell enhancements, e.g. for offload from vehicular UEs in outdoor small cells, can be studied in succeeding study items. Solutions for excluding very high mobility users should be considered.

The benefits of allowing high speed UE in small cells should be evaluated e.g. UE throughput gain, improved robustness of mobility, improved UE power efficiency, and up to which speed offloading is beneficial. Other topics e.g. how UE speed can be estimated in small cells can also be treated in succeeding study items of small cell enhancements.

Real-time services should be supported in small cell enhancement. The impact of mobility between small cell nodes and between small cell and overlaid macro nodes on quality (e.g. interruption time, packet loss) should be less than or equal to that provided by 3GPP Release 10/11 E-UTRA/E-UTRAN.

Small cell enhancement should consider techniques and mechanisms to reduce C-plane/U-plane latency and packet loss during mobility between macro cell nodes and small cell nodes, as well as between small cell nodes compared to 3GPP Release 10/11 E-UTRA/E-UTRAN.

Mobility enhancements considered under the future technical Study Item should be relevant to the deployment scenarios described above. Further enhancements which are not covered by other Study Items/Work Items (e.g. HetNet Mobility) should be considered, and duplicated work should be avoided.

Coverage performance—Small cell enhancement coverage should be sufficiently flexible for both uplink and downlink to support a variety of deployment scenarios described above.

Operational Requirements

Architecture—The E-UTRAN architecture should be able to achieve the system and mobility performance targeted for small cell enhancement described in clause 8.1. The studies for architecture should first identify which kind of information is needed or beneficial to be exchanged between nodes in order to get the desired improvements before the actual type of interface is determined.

Cost and complexity—Small cell enhancement shall satisfy the required performance. Additionally, cost and complexity shall be minimized in order to support small cell enhancement deployments described above.

Small cell enhancement should allow for low network cost by:
  allowing for solutions aiming at different backhauls,
  allowing for low-cost deployment, low operation and maintenance tasks, e.g. by means of SON functionality, minimization of drive tests, etc.,
  allowing for reduced base station implementation cost, considering e.g. relaxation of RF requirements in small cell scenarios Here, all the interfaces specified shall be open for multi-vendor equipment interoperability.

Small cell enhancement should be possible to implement with low incremental complexity of UE and allow for long UE battery life (standby and active).

Different UE capabilities should be considered for small-cell enhancements, especially with respect to features related to UE RF complexity such as the possibility for simultaneous transmission to and reception from the macro and small cell layers.

System complexity shall be minimized in order to stabilize the system & inter-operability in earlier stage and decrease the cost of terminal & network. For these requirements, the following shall be taken into account:
  a) Minimize the number of options
  b) No redundant mandatory features
  c) Limit the number of necessary test cases, e.g. by limiting the number of states of protocols and the number of procedures, with appropriate parameter range and granularity.

Energy efficiency—Small cell enhancement should target the network energy efficiency to be as high as possible, given a reasonable system complexity with considering the traffic characteristics of small cell enhancement described above. Furthermore, placing small cells in a dormant mode could be supported considering the increased likelihood of small cells not serving any active users. The trade-off between user throughput/capacity per unit area and network energy efficiency should be considered.

High UE energy efficiency should be targeted taking into account the small cell's short range transmission path. This means balancing effort in terms of UE energy efficiency, e.g., reducing required energy/bit for the UL, UE mobility measurements, cell identification and small cell discovery, end-user experience and system performance.

Security—The small cell enhancement area architecture should have a comparable level of security as Release 10/11 E-UTRA and E-UTRAN for the deployment scenarios of small cell enhancement described above.

Dual Connectivity

In the heterogeneous networks which supports small cell enhancement, there are various requirements related to mobility robustness, increased signalling load due to frequent handover and improving per-user throughput and system capacity, etc.

As a solution to realize these requirements, E-UTRAN supports Dual Connectivity (DC) operation whereby a multiple RX/TX UE in RRC_CONNECTED is configured to utilize radio resources provided by two distinct schedulers, located in two eNBs connected via a non-ideal backhaul over the X2 interface. The Dual connectivity may imply Control and Data separation where, for instance, the control signaling for mobility is provided via the macro cell at the same time as high-speed data connectivity is provided via the small cell. Also, a separation between downlink and uplink, the downlink and uplink connectivity is provided via different cells.

eNBs involved in dual connectivity for a certain UE may assume two different roles, i.e. an eNB may either act as an MeNB or as an SeNB. In dual connectivity a UE can be connected to one MeNB and one SeNB. MeNB is the eNB which terminates at least S1-MME in dual connectivity, and SeNB is the eNB that is providing additional radio resources for the UE but is not the Master eNB in dual connectivity.

In addition, DC with CA configured means mode of operation of a UE in RRC_CONNECTED, configured with a Master Cell Group and a Secondary Cell Group. Here, "cell group" is a group of serving cells associated with either the Master eNB (MeNB) or the Secondary eNB (SeNB) in dual connectivity. "Master Cell Group (MCG)" is a group of serving cells associated with the MeNB, comprising of the primary cell (PCell) and optionally one or more secondary cells (SCells) in dual connectivity. "Secondary Cell Group (SCG)" is a group of serving cells associated with the SeNB comprising of primary SCell (pSCell) and optionally one or more SCells.

Here, the "cell" described herein should be distinguished from a 'cell' as a general region covered by a eNB. That is, cell means combination of downlink and optionally uplink resources. The linking between the carrier frequency (i.e. center frequency of the cell) of the downlink resources and the carrier frequency of the uplink resources is indicated in the system information transmitted on the downlink resources.

MCG bearer is radio protocols only located in the MeNB to use MeNB resources only in dual connectivity, and SCG bearer is radio protocols only located in the SeNB to use SeNB resources in dual connectivity. And, Split bearer is radio protocols located in both the MeNB and the SeNB to use both MeNB and SeNB resources in dual connectivity.

FIG. 6 illustrates network interfaces for Dual Connectivity in the wireless communication system to which the present invention can be applied.

FIG. 6(a) illustrates Control Plane architecture for Dual Connectivity, and FIG. 6(b) illustrates User Plane architecture for Dual Connectivity.

Inter-eNB control plane signalling for dual connectivity can be performed by means of X2 interface signalling. Control plane signalling towards the MME is performed by means of S1 interface signalling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB can be performed by means of X2 interface signalling.

Referring to the FIG. 6(a), the MeNB is C-plane connected to the MME via S1-MME, the MeNB and the SeNB are interconnected via X2-C.

FIG. 6(b) shows U-plane connectivity of eNBs involved in dual connectivity for a certain UE. U-plane connectivity depends on the bearer option configured as follow.

For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. Here, split bearer is radio protocols located in both the MeNB and the SeNB to use both MeNB and SeNB resources. For SCG bearers, the SeNB is directly connected with the S-GW via S1-U. Thus, if only MCG and split bearers are configured, there is no S1-U termination in the SeNB.

FIG. 7 illustrates architecture of radio interface protocol for Dual Connectivity function, which includes split bearer option and/or SCG bearer option, between the Network and a UE in the wireless communication system to which the present invention can be applied.

In Dual Connectivity, the radio protocol architecture that a particular bearer uses depends on how the bearer is setup. Three alternatives exist, MCG bearer, SCG bearer and split bearer. That is, some bearers (e.g., SCG bearers) of a UE may be served by the SeNB while others (e.g., MCG bearers) are only served by the MeNB. Also, some bearers (e.g., split bearers) of a UE may be split while others (e.g., MCG bearers) are only served by the MeNB. Those three alternatives are depicted on FIG. 7.

In case that MCG bearer and/or SCG bearer is setup, S1-U terminates the currently defined air-interface U-plane protocol stack completely per bearer at a given eNB, and is tailored to realize transmission of one EPS bearer by one node. The transmission of different bearers may still happen simultaneously from the MeNB and a SeNB.

In case that split bearer is setup, S1-U terminates in MeNB with the PDCP layer residing in the MeNB always. There is a separate and independent RLC bearer (SAP above RLC), also at UE side, per eNB configured to deliver PDCP PDUs of the PDCP bearer (SAP above PDCP), terminated at the MeNB. The PDCP layer provides PDCP PDU routing for transmission and PDCP PDU reordering for reception for split bearers in DC.

SRBs are always of the MCG bearer and therefore only use the radio resources provided by the MeNB. Here, DC can also be described as having at least one bearer configured to use radio resources provided by the SeNB.

FIG. 8 illustrates Control plane architecture for Dual Connectivity in the wireless communication system to which the present invention can be applied.

Each eNB should be able to handle UEs autonomously, i.e., provide the PCell to some UEs while acting as assisting eNB for other. It is assumed that there will be only one S1-MME Connection per UE.

In dual connectivity operation, the SeNB owns its radio resources and is primarily responsible for allocating radio resources of its cells. Thus, some coordination is still needed between MeNB and SeNB to enable this.

At least the following RRC functions are relevant when considering adding small cell layer to the UE for dual connectivity operation:

Small cell layer's common radio resource configurations
Small cell layer's dedicated radio resource configurations
Measurement and mobility control for small cell layer In dual connectivity operation, a UE always stays in a single RRC state, i.e., either RRC_CONNECTED or RRC_IDLE.

Referring to the FIG. 8, only the MeNB can generate the final RRC messages to be sent towards the UE after the coordination of RRM functions between MeNB and SeNB. The UE RRC entity sees all messages coming only from one entity (in the MeNB) and the UE only replies back to that entity. L2 transport of these messages depends on the chosen UP architecture and the intended solution.

The following general principles can be applied for the operation of dual connectivity.

1) The MeNB maintains the RRM measurement configuration of the UE and may, e.g., based on received measurement reports or traffic conditions or bearer types, decide to ask an SeNB to provide additional resources (serving cells) for a UE.

2) Upon receiving the request from the MeNB, an SeNB may create the container that will result in the configuration of additional serving cells for the UE (or decide that it has no resource available to do so).

3) The MeNB and the SeNB exchange information about UE configuration by means of RRC containers (inter-node messages) carried in Xn messages. Here, the Xn interface can be an X2 interface in LTE/LTE-A system.

4) The SeNB may initiate a reconfiguration of its existing serving cells (e.g., PUCCH towards the SeNB).

5) The MeNB may not change the content of the RRC configuration provided by the SeNB.

X2 Connection Establishment

The purpose of the Automatic Neighbour Relation (ANR) function is to relieve the operator from the burden of manually managing Neighbour Relations (NRs).

The ANR function resides in the eNB and manages the conceptual Neighbour Relation Table (NRT). Located within ANR, the Neighbour Detection Function finds new neighbours and adds them to the NRT. ANR also contains the Neighbour Removal Function which removes outdated NRs. The Neighbour Detection Function and the Neighbour Removal Function are implementation specific.

For each cell that the eNB has, the eNB keeps a NRT. For each NR, the NRT contains the Target Cell Identifier (TCI), which identifies the target cell. For E-UTRAN, the TCI corresponds to the E-UTAN Cell Global Identifier (ECGI) and Physical Cell Identifier (PCI) of the target cell.

Neighbour cell Relations are cell-to-cell relations, while an X2 link is set up between two eNBs. Neighbour cell Relations are unidirectional, while an X2 link is bidirectional.

Hereinafter, with reference to FIG. 9, the ANR function will be described.

FIG. 9 illustrates ANR function in the wireless communication system to which the present invention can be applied.

Referring to FIG. 9, the serving eNB 1 transmits the RRC CONNECTION RECONFIGURATION message to the UE and configures the measurement procedure (S901).

That is, through the RRC CONNECTION RECONFIGURATION message, for example, in case that the signal quality and the like are fine as much as a specific offset in comparison with the serving cell, the serving eNB 1 may instruct the UE to transmit the measurement report.

By searching neighboring cell, the UE distinguishes the PCI of the neighboring cell, and measures Reference Signal Received Power (RSRP) and/or Reference Signal Received Quality (RSRQ) of the neighboring cell. And, if the reporting event occurs, the UE transmits the MEASUREMENT REPORT to the eNB 1 (S903).

The MEASUREMENT REPORT of the UE includes the PCI of the neighboring cell that the UE searched.

When receiving the MEASUREMENT REPORT of the neighboring cell from the UE, the eNB 1 decides handover of the UE based on the MEASUREMENT REPORT and radio resource management (RRM) information. And, when the handover of the UE is decided, the eNB 1 checks whether the reported PCI is included in its NRT (S905).

If the PCI is included in its NRT, the eNB 1 proceeds to the general handover procedure.

On the other hand, if the PCI is not included in its NRT, the eNB 1 proceeds to the ANR procedure. Hereinafter, it is assumed that the PCI of the neighboring cell is not included in the NRT of the eNB 1.

Since the PCI is not included in the NRT, the eNB 1 transmits the RRC CONNECTION RECONFIGURATION message to the UE, and instructs the UE to read the ECGI of the target cell (S907).

Here, the eNB 1 may instruct the UE to read Tracking Area Code (TAC) and Public Land Mobile Network (PLMN) identity together with the ECGI of the target cell.

The UE, first of all, reads the MIB transmitted through the PBCH which is broadcasted from the target cell, and after reading the DCI transmitted through the PDCCH, reads the requested information (e.g., the ECGI of the target cell) by reading the SIB1 transmitted through the PDSCH. And the UE transmits the ECGI of the target cell to the eNB 1 through the MEASUREMENT REPORT.

Later, the X2 connection establishment procedure between the serving eNB and the target eNB will be described with reference to FIG. 10. The X2 connection establishment procedure includes the TNL address discovery procedure and the X2 setup procedure.

FIG. 10 illustrates X2 connection establishment in the wireless communication system to which the present invention can be applied.

In FIG. 10, it is assumed that the neighboring eNB that the UE searched in FIG. 9 is the eNB 2.

If the eNB 1 is aware of the eNB ID of the candidate eNB 2 (e.g. via the ANR function of the FIG. 9) but not a TNL address suitable for SCTP connectivity, then the eNB 1 can utilize the Configuration Transfer Function to determine the TNL address as follow.

The eNB 1 sends the eNB CONFIGURATION TRANSFER message to the MME to request the TNL address of the candidate eNB 2, and the eNB CONFIGURATION TRANSFER message includes relevant information such as the source and target eNB ID (i.e. ECGI) (S1001).

The MME relays the request by sending the MME CONFIGURATION TRANSFER message to the candidate eNB 2 identified by the target eNB ID (S1003).

The candidate eNB 2 responds by sending the eNB CONFIGURATION TRANSFER message containing one or more TNL addresses to be used for SCTP connectivity with the initiating eNB 1, and the eNB CONFIGURATION TRANSFER message includes other relevant information such as the source and target eNB ID (S1005).

The MME relays the response by sending the MME CONFIGURATION TRANSFER message to the initiating eNB 1 identified by the source eNB ID (S1007).

The eNB 1 proceeds to establish an IPSec tunnel and an SCTP connection towards the neighbouring eNB 2. Once this has been completed, the two eNB (i.e., eNB 1 and eNB 2) are able to signal to one another using the X2-AP.

Subsequently, the eNB 1 proceeds to establish the SCTP connection with the eNB 2 (S1009). Once this has been completed, the two eNBs (i.e., eNB 1 and eNB 2) are able to signal to one another using the X2-AP.

And the eNB 1 transmits the X2 SETUP REQUEST message to the eNB 2 (S1011).

The X2 SETUP REQUEST message specifies the neighboring cell information such as the ECGI, PCI, RF carrier, and the like. The eNB 2 that receives the X2 SETUP REQUEST message from the eNB 1 stores the neighboring cell information which is specified by the X2 SETUP REQUEST message.

The neighboring eNB 2 transmits the X2 SETUP RESPONSE message to the eNB 1 (S1013).

The eNB 1 that receives the X2 SETUP RESPONSE message stores the neighboring cell information which is specified by the X2 SETUP RESPONSE message.

Later, the eNB 1 and the eNB 2 which the X2 connection is established between, if it is required to update the application level configuration later, proceed to the eNB Configuration Update Procedure.

Hereinafter, the eNB Configuration Transfer procedure, MME Configuration Transfer procedure, X2 Setup procedure, eNB Configuration Update procedure will be described in more detail.

eNB Configuration Transfer Procedure

FIG. 11 illustrates eNB Configuration Transfer procedure in the wireless communication system to which the present invention can be applied.

The purpose of the eNB Configuration Transfer procedure is to transfer RAN configuration information from the eNB to the MME in unacknowledged mode. The MME does not interpret the transferred RAN configuration information. This procedure uses non-UE associated signalling.

Referring to the FIG. 11, an eNB initiates the eNB Configuration Transfer procedure by sending the ENB CONFIGURATION TRANSFER message to the MME (S1101).

That is, the eNB Configuration Transfer procedure is initiated by the eNB to request and/or transfer RAN configuration information via the core network. The eNB CONFIGURATION TRANSFER message contains RAN configuration information (e.g. self-organizing network (SON) Configuration Transfer IE) and other relevant information such as the routing address which identifies the final RAN destination node.

If the MME receives the SON Configuration Transfer IE, it shall transparently transfer the SON Configuration Transfer IE towards the eNB indicated in the Target eNB-ID IE which is included in the SON Configuration Transfer IE.

MME Configuration Transfer Procedure

FIG. 12 illustrates MME Configuration Transfer procedure in the wireless communication system to which the present invention can be applied.

The purpose of the MME Configuration Transfer procedure is to transfer RAN configuration information from the MME to the eNB in unacknowledged mode. This procedure uses non-UE associated signalling.

Referring to the FIG. 12, a MME initiates the MME Configuration Transfer procedure by sending the MME CONFIGURATION TRANSFER message to an eNB (S1201).

That is, the MME Configuration Transfer procedure is initiated by the MME to request and/or transfer RAN configuration information to the eNB. The MME CONFIGURATION TRANSFER message contains RAN configuration information (e.g. SON Configuration Transfer IE) and other relevant information.

If the eNB receives, in the SON Configuration Transfer IE, the SON Information IE containing the SON Information Request IE, it may transfer back the requested information towards the eNB indicated in the Source eNB-ID IE of the SON Configuration Transfer IE by initiating the eNB Configuration Transfer procedure.

If the eNB receives, in the SON Configuration Transfer IE, the X2 TNL Configuration Info IE containing the eNB X2 Extended Transport Layer Addresses IE, it may use it as part of its ACL functionality configuration actions, if such ACL functionality is deployed.

If the eNB receives, in the SON Configuration Transfer IE, the SON Information IE containing the SON Information Reply IE including the X2 TNL Configuration Info IE as an answer to a former request, it may use it to initiate the X2 TNL establishment.

In case the IP-Sec Transport Layer Address IE is present and the GTP Transport Layer Addresses IE within the eNB X2 Extended Transport Layer Addresses IE is not empty, GTP traffic is conveyed within an IP-Sec tunnel terminated at the IP-Sec tunnel end point given in by the IP-Sec Transport Layer Address IE.

In case the IP-Sec Transport Layer Address IE is not present, GTP traffic is terminated at the end points given by the list of addresses in eNB GTP Transport Layer Addresses IE within the eNB X2 Extended Transport Layer Addresses IE.

In case the eNB GTP Transport Layer Addresses IE is empty and the IP-Sec Transport Layer Address IE is present, SCTP traffic is conveyed within an IP-Sec tunnel terminated at the IP-Sec tunnel end point given in the IP-Sec Transport Layer Address IE, within the eNB X2 Extended Transport Layer Addresses IE.

If the eNB is configured to use one IPsec tunnel for all S1 and X2 traffic (IPsec star topology) then the traffic to the peer eNB shall be routed through this IPsec tunnel and the IP-Sec Transport Layer Address IE shall be ignored.

If the eNB receives the SON Information IE containing the SON Information Reply IE including the Time Synchronization Info IE as an answer to a former request, it may use it for over-the-air synchronization by means of network listening.

X2 Setup Procedure

FIG. 13 illustrates X2 setup procedure in the wireless communication system to which the present invention can be applied.

The purpose of the X2 setup procedure is to exchange application level data needed for two eNBs to interoperate correctly over an X2 interface. This procedure erases any existing application level configuration data in the two nodes and replaces it by the one received. This procedure also resets the X2 interface like a reset procedure would do. The Procedure uses non UE-associated signaling.

Referring to the FIG. 13, an eNB 1 initiates the X2 setup procedure by sending the X2 SETUP REQUEST message to a candidate eNB 2 (S1301).

The X2 SETUP REQUEST message is sent by an eNB to a neighboring eNB to transfer the initialization information for a transport network layer (TNL) association.

After the candidate eNB 2 receives the X2 SETUP REQUEST message, step 1303 or step 1305 is selectively performed according to whether or not eNB 2 can accept the setup.

If the candidate eNB 2 can accept the setup, the candidate eNB 2 responds with an X2 SETUP RESPONSE message to the eNB 1 (S1303).

The X2 SETUP RESPONSE message is sent by an eNB to a neighboring eNB to transfer the initialization information for a TNL association.

The initiating eNB1 shall transfer the complete list of its served cells and, if available, a list of supported Globally Unique (GU) Group IDs to the candidate eNB2. The candidate eNB2 shall reply with the complete list of its served cells and shall include, if available, a list of supported GU Group IDs in the reply.

If a cell is switched off for energy savings reasons, it should be activated before initiating or responding to the X2 setup procedure and shall still be included in the list of served cells.

The initiating eNB 1 may include the Neighbour Information IE in the X2 SETUP REQUEST message. The candidate eNB 2 may also include the Neighbour Information IE in the X2 SETUP RESPONSE message. The Neighbour Information IE shall only include E-UTRAN cells that are direct neighbours of cells in the reporting eNB. A direct neighbour of one cell of a given eNB may be any cell belonging to an eNB that is a neighbour of that given eNB cell e.g. even if the cell has not been reported by a UE. The initiating eNB 1 may include the Tracking Area Code (TAC) IE with the Neighbour Information IE in the X2 SETUP REQUEST message. The candidate eNB 2 may also include the TAC IE with the Neighbour Information IE in the X2 SETUP RESPONSE message.

The initiating eNB1 may include the Number of Antenna Ports IE in the X2 SETUP REQUEST message. The candidate eNB 2 may also include the Number of Antenna Ports IE in the X2 SETUP RESPONSE message.

The initiating eNB1 may include the PRACH Configuration IE in the X2 SETUP REQUEST message. The candidate eNB2 may also include the PRACH Configuration IE in the X2 SETUP RESPONSE message. The eNB receiving the IE may use this information for RACH optimization.

The initiating eNB 1 may include the MBSFN Subframe Info IE in the X2 SETUP REQUEST message. The candidate eNB 2 may also include the MBSFN Subframe Info IE in the X2 SETUP RESPONSE message.

For each Closed Subscriber Group (CSG) cell or hybrid cell served by the initiating eNB 1, the X2 SETUP REQUEST message shall contain the CSG ID IE. For each CSG cell or hybrid cell served by the candidate eNB 2, the X2 SETUP RESPONSE message shall contain the CSG ID IE. The eNB receiving the IE shall take this information into account when further deciding whether X2 handover between the source cell and the target cell may be performed.

The initiating eNB 1 may include the Multimedia Broadcast Multicast Service (MBMS) Service Area Identity List IE in the X2 SETUP REQUEST message. The candidate eNB2 may also include the MBMS Service Area Identity List IE in the X2 SETUP RESPONSE message.

For each cell served by the initiating eNB 1, the X2 SETUP REQUEST message may contain the MultibandInfoList IE. For cell served by the candidate eNB 2, the X2 SETUP RESPONSE message may contain the MultibandInfoList IE. The eNB receiving the IE shall, if supported, take this information into account when further deciding whether subsequent mobility actions between the source cell and the target cell may be performed.

Meanwhile, if the candidate eNB 2 cannot accept the setup, the candidate eNB 2 responds with an X2 SETUP FAILURE message to the eNB 1 (S1305).

The X2 SETUP FAILURE message is sent by the eNB to indicate X2 Setup failure.

If the X2 SETUP FAILURE messages includes the Time To Wait IE the initiating eNB 1 shall wait at least for the indicated time before reinitiating the X2 Setup procedure towards the same eNB 2.

eNB Configuration Update Procedure

The purpose of the eNB Configuration Update procedure is to update application level configuration data needed for two eNBs to interoperate correctly over the X2 interface. The procedure uses non UE-associated signalling.

FIG. 14 illustrates eNB Configuration Update procedure in the wireless communication system to which the present invention can be applied.

Referring to the FIG. 14, an eNB 1 initiates the procedure by sending an ENB CONFIGURATION UPDATE message to a peer eNB 2 (S1401).

The ENB CONFIGURATION UPDATE message shall include an appropriate set of up-to-date configuration data, including, but not limited to, the complete lists of added, modified and deleted served cells, that eNB 1 has just taken into operational use.

Upon reception of the ENB CONFIGURATION UPDATE message, eNB 2 shall update the information for eNB 1 as follows.

1) Update of Served Cell Information

If Served Cells To Add IE is contained in the ENB CONFIGURATION UPDATE message, eNB 2 shall add cell information according to the information in the Served Cell Information IE.

If Number of Antenna Ports IE is contained in the Served Cell Information IE in the ENB CONFIGURATION UPDATE message, eNB2 may use this information (e.g., for Channel State Information reference signal (CSI-RS) transmission or for periodic and aperiodic sounding reference signal (SRS) transmission).

If the PRACH Configuration IE is contained in the Served Cell Information IE in the ENB CONFIGURATION UPDATE message, the eNB receiving the IE may use this information for RACH optimisation.

If Served Cells To Modify IE is contained in the ENB CONFIGURATION UPDATE message, eNB2 shall modify information of cell indicated by Old ECGI IE according to the information in the Served Cell Information IE.

If MBSFN Subframe Info IE is contained in the Served Cell Information IE in the ENB CONFIGURATION UPDATE message, eNB2 may use this information. If a MBSFN subframe indicated in the MBSFN Subframe Info IE coincides with an Almost Blank Subframe (ABS), the eNB2 shall consider that the subframe is designated as ABS by the sending eNB.

When either served cell information or neighbour information of an existing served cell in eNB1 need to be updated, the whole list of neighbouring cells, if any, shall be contained in the Neighbour Information IE.

If the Deactivation Indication IE is contained in Served Cells To Modify IE, it indicates that the concerned cell was switched off to lower energy consumption.

The eNB2 shall overwrite the served cell information and the whole list of neighbour cell information for the affected served cell.

If Served Cells To Delete IE is contained in the ENB CONFIGURATION UPDATE message, eNB2 shall delete information of cell indicated by Old ECGI IE.

If MBMS Service Area Identity List IE is contained in the Served Cell Information IE in the ENB CONFIGURATION UPDATE message, the eNB receiving the IE may use it.

When the MBMS Service Area Identities of a cell in eNB1 need to be updated, the whole list of MBMS Service Area Identities of the affected cell shall be contained in the Served Cell Information IE.

2) Update of GU Group ID List

If GU Group Id To Add List IE is contained in the ENB CONFIGURATION UPDATE message, eNB 2 shall add the GU Group Id to its GU Group Id List.

If GU Group Id To Delete List IE is contained in the ENB CONFIGURATION UPDATE message, eNB 2 shall remove the GU Group Id from its GU Group Id List.

If Neighbour Information IE is contained in the ENB CONFIGURATION UPDATE message, eNB 2 may use this information to update its neighbour cell relations, or use it for other functions, like Physical Cell Identifier (PCI) selection. The Neighbour Information IE shall only include E-UTRAN cells that are direct neighbours of cells in the reporting eNB. A direct neighbour of one cell of a given eNB may be any cell belonging to an eNB that is a neighbour of that given eNB cell e.g. even if that cell has not been reported by a UE. The Neighbour Information IE may contain the TAC IE of the included cells. The receiving eNB may use TAC IE. Tracking Area identity (TAI) is used to identify tracking areas. The TAI is constructed from the PLMN identity the tracking area belongs to and the TAC of the Tracking Area.

After the update procedure of requested information by eNB 2, step 1403 or step 1405 is selectively performed according to whether or not eNB 2 completes successful update of requested information.

After successful update of requested information, eNB replies with the ENB CONFIGURATION UPDATE ACKNOWLEDGE message to inform the initiating eNB 1 that the requested update of application data was performed successfully (S1403).

In case the peer eNB 2 receives an ENB CONFIGURATION UPDATE without any IE except for Message Type IE, the peer eNB 2 shall reply with ENB CONFIGURATION UPDATE ACKNOWLEDGE message without performing any updates to the existing configuration.

The eNB 1 may initiate a further eNB Configuration Update procedure only after a previous eNB Configuration Update procedure has been completed.

Meanwhile, if the eNB 2 cannot accept the update, the eNB 2 responds with an ENB CONFIGURATION UPDATE FAILURE message (S1405).

If the ENB CONFIGURATION UPDATE FAILURE message includes the Time To Wait IE the eNB 1 shall wait at least for the indicated time before reinitiating the eNB Configuration Update procedure towards the same eNB 2. Both nodes shall continue to operate the X2 with their existing configuration data.

Direct or Indirect Signaling Procedure Between eNBs for Dual Connectivity

Currently, Macro eNB and small cell eNB have the X2 connection. The current ANR procedure works well for it. That is the existing TNL address discovery procedure could be used to get the IP address of small cell eNB, after which the SCTP and X2 setup are performed.

However, if the small cell eNB supports dual connection, i.e., taking the role of small cell, thus how the Xn and/or X2 interface between Macro eNB and small cell eNB should be set up is still an issue to solve.

As described above, in case that the UE served by the macro eNB searches neighboring small cell eNBs and reports the measurement report, the X2 or Xn interface setup is required between the macro eNB and the small cell eNB. Furthermore, in order to support the dual connectivity by the macro eNB and the small cell eNB (particularly, in the situation there coexist the eNB that supports the dual connectivity and the eNB that does not supports it), the macro eNB is necessary to check whether the small cell eNB which is the neighboring eNB searched by the UE supports the dual connectivity.

According to this, the present invention suggests the improved X2 or Xn setup procedure between the macro eNB and the small cell eNB and the improved eNB configuration update procedure. In addition, the present invention suggests the improved TNL address discovery procedure between the macro eNB and the small cell eNB in case that the MME and the small cell eNB have the S1 connection.

The present invention may be applied to both of the case that the macro eNB and the small cell eNB have the X2 connection and the case that the macro eNB and the small cell eNB have the Xn connection together with the X2 connection. Hereinafter, the two cases will be separately described.

1) Case 1: The case that the macro eNB and the small cell eNB have the X2 connection FIG. 15 is a drawing exemplifying the X2 Setup procedure according to an embodiment of the present invention.

In FIG. 15, it is assumed that the eNB 1 is the macro eNB (MeNB) and the eNB 2 is the small cell eNB (SeNB).

FIG. 15 (*a*) illustrates the X2 Setup procedure initiated by the eNB 1, and FIG. 15 (*b*) illustrates the X2 Setup procedure initiated by the eNB 2.

Referring to FIG. 15 (*a*), the eNB 1 initiates the X2 Setup procedure by sending X2 SETUP REQUEST message to the eNB 2 (S1501). Here, the X2 SETUP REQUEST message may include the same information described in FIG. 13.

If the eNB 2 can accept the setup, the eNB 2 replies with X2 SETUP RESPONSE message including an indication of Dual Connectivity support (or indication of added Dual Connectivity functions) to the eNB 1 (S1503). Here, the X2 SETUP RESPONSE message may include an identifier that represents whether the eNB 2 supports the Dual Connectivity. Whether the eNB 2 supports the Dual Connectivity means whether the eNB 2 supports the Dual Connectivity function (split bearer option, SCG bearer option, or both options) for a UE. In addition, the X2 SETUP RESPONSE message may include the same information described in FIG. 13 as well as the indication of Dual Connectivity support.

Then, when the eNB 1 received the X2 SETUP RESPONSE message including the indication of Dual Connectivity support, it is notified that the eNB 2 supports the Dual Connectivity function (i.e., split bearer option, SCG bearer option, or both options for UE).

Later, in case that the eNB 2 supports the Dual Connectivity for the UE, the eNB 1 and the eNB 2 may transmit and receive the signaling for the Dual Connectivity function (split bearer option, SCG bearer option, or both options) and provide radio resources to the UE for each eNB through the cooperation among eNBs.

Referring to FIG. 15 (*b*), the eNB 2 initiates X2 Setup procedure by sending X2 SETUP REQUEST message including an indication of Dual Connectivity support (or indication of added Dual Connectivity functions) to the eNB (S1505). Here, the X2 SETUP REQUEST message may include an identifier that represents whether the eNB 2 supports the Dual Connectivity. In addition, the X2 SETUP REQUEST message may include the same information described in FIG. 13 as well as the indication of Dual Connectivity support.

Then, when the eNB 1 received the X2 SETUP REQUEST message including the indication of Dual Connectivity support, it is notified that the eNB 2 supports Dual Connectivity function (i.e., split bearer option, SCG bearer option, or both options for UE).

If the eNB 1 can accept the setup, the eNB 1 replies with X2 SETUP RESPONSE message to the eNB 2 (S1507). Here, the X2 SETUP RESPONSE message may include the same information described in FIG. 13 as well as the indication of Dual Connectivity support.

Later, in case that the eNB 2 supports the Dual Connectivity for the UE, the eNB 1 and the eNB 2 may transmit and receive the signaling for the Dual Connectivity function (split bearer option, SCG bearer option, or both options) and provide radio resources to the UE for each eNB through the cooperation among eNBs.

The above indication of Dual Connectivity support could also be included in eNB configuration update/response messages to realize the same goal as in X2 setup/response messages. These will be described with reference to FIG. 16 below.

FIG. 16 is a drawing exemplifying the eNB configuration update procedure according to an embodiment of the present invention.

In FIG. 16, it is assumed that the eNB 1 is the macro eNB (MeNB) and the eNB 2 is the small cell eNB (SeNB). FIG. 16 (*a*) illustrates the eNB configuration update procedure initiated by the eNB 1, and FIG. 16 (*b*) illustrates the eNB configuration update procedure initiated by the eNB 2.

Referring to FIG. 16 (*a*), the eNB 1 initiates eNB configuration update procedure by sending eNB CONFIGURA- TION UPDATE REQUEST message to the eNB 2 (S1601). Here, the eNB CONFIGURATION UPDATE REQUEST message may include the same information described in FIG. 14.

The eNB 2 replies with eNB CONFIGURATION UPDATE RESPONSE message including an indication of Dual Connectivity support (or indication of added Dual Connectivity functions) to the eNB 1 (S1603). Here, the eNB CONFIGURATION UPDATE RESPONSE message may include an identifier that indicates whether the eNB 2 supports the Dual Connectivity. Whether the eNB 2 supports the Dual Connectivity represents whether the eNB 2 supports the Dual Connectivity function (split bearer option, SCG bearer option, or both options) for a UE. In addition, the eNB CONFIGURATION UPDATE RESPONSE message may include the same information described in FIG. 14 as well as the indication of Dual Connectivity support.

Then, when the eNB 1 received the eNB CONFIGURATION UPDATE RESPONSE message including the indication of Dual Connectivity support, it is notified that the eNB 2 supports the Dual Connectivity function (i.e., split bearer option, SCG bearer option, or both options for UE).

Later, in case that the eNB 2 supports the Dual Connectivity for the UE, the eNB 1 and the eNB 2 may transmit and receive the signaling for the Dual Connectivity function (split bearer option, SCG bearer option, or both options) and provide radio resources to the UE for each eNB through the cooperation among eNBs.

Referring to FIG. 16 (*b*), the eNB 2 initiates the eNB configuration update procedure by sending the eNB CONFIGURATION UPDATE REQUEST message including an indication of Dual Connectivity support to the eNB 1 (or indication of added Dual Connectivity functions) (S1605). Here, the eNB CONFIGURATION UPDATE REQUEST message may include an identifier that represents whether the eNB 2 supports the Dual Connectivity. In addition, the eNB CONFIGURATION UPDATE REQUEST message may include the same information described in FIG. 14 as well as the indication of Dual Connectivity support.

Then, when the eNB 1 received the eNB CONFIGURATION UPDATE REQUEST message including the indication of Dual Connectivity support, it is notified that the eNB 2 supports the Dual Connectivity function (i.e., split bearer option, SCG bearer option, or both options for UE).

The eNB 1 replies with the eNB CONFIGURATION UPDATE RESPONSE message to the eNB 2 (S1607). Here, the eNB CONFIGURATION UPDATE RESPONSE message may include the same information described in FIG. 14.

Later, in case that the eNB 2 supports the Dual Connectivity for the UE, the eNB 1 and the eNB 2 may transmit and receive the signaling for the Dual Connectivity function (split bearer option, SCG bearer option, or both options) and provide radio resources to the UE for each eNB through the cooperation among eNBs.

As described above, in case that the MME and the small cell eNB have the S1 connection, the TNL address discovery procedure may be newly defined.

FIG. 17 is a drawing exemplifying the network architecture including the small cell according to an embodiment of the present invention.

FIG. 17 represents the case that the S1 interface exists between the MME and the macro cell eNB, and does the MME and the small cell eNB respectively. And it is assumed that the S1 connection is established between the MME and the macro cell eNB though, the S1 connection does not exist between the MME and the small cell eNB.

In the situation of FIG. 17, the TNL address discovery procedure is applied with modifying the reply message as shown in FIG. 18.

FIG. 18 is a drawing conceptually illustrating the TNL address discovery according to an embodiment of the present invention.

Referring to FIG. 18, in case that UE currently served by macro eNB discovers small cell eNB (e.g., Pico eNB supporting SeNB function such as Dual Connectivity), the macro eNB requests the TNL address of the small cell eNB (e.g., Pico eNB) to the MME.

And, when receiving the request for the TNL address of the small cell eNB from the macro eNB, the MME forwards the request of the macro eNB to the small cell eNB.

Then, the small cell eNB replies one TNL address with an indication of Dual Connectivity support (or indication of added Dual Connectivity functions) to the MME. Here, the indication of Dual Connectivity support represents whether the eNB 2 supports the Dual Connectivity function (split bearer option, SCG bearer option, or both options) for a UE.

When receiving a response from the small cell eNB, the MME forwards one TNL address and the indication of Dual Connectivity support received from the small cell eNB to the macro eNB.

Then, when the macro eNB gets indication of Dual Connectivity support, it is notified that the small cell eNB supports the Dual Connectivity function (i.e., split bearer option, SCG bearer option, or both options for UE).

Hereinafter, the TNL address discovery procedure according to an embodiment of the present invention will be described with reference FIG. 19 and FIG. 20 below.

FIG. 19 and FIG. 20 are drawings exemplifying the TNL address discovery procedure according to an embodiment of the present invention.

In FIG. 19 and FIG. 20, it is assumed that the eNB 1 is the macro eNB (MeNB) and the eNB 2 is the small cell eNB/Pico eNB (supporting SeNB function such as Dual Connectivity). FIG. 19 illustrates the TNL address discovery procedure initiated by the eNB 1, and FIG. 20 illustrates the TNL address discovery procedure initiated by the eNB 2.

Referring to FIG. 19, the eNB 1 sends the eNB CONFIGURATION TRANSFER message to the MME to request the TNL address of the eNB 2 (S1901). Here, the eNB CONFIGURATION TRANSFER message includes the relevant information such as the source and target eNB ID (i.e. ECGI).

The MME relays the request by sending the MME CONFIGURATION TRANSFER message to the eNB 2 identified by the target eNB ID (S1903).

The eNB 2 responds by sending the eNB CONFIGURATION TRANSFER message containing one or more TNL addresses to be used for SCTP connectivity with the initiating eNB 1 and indication of Dual Connectivity support to MME (S1905).

Here, the indication of Dual Connectivity support represents whether the eNB 2 supports the Dual Connectivity function (split bearer option, SCG bearer option, or both options) for a UE. In addition, the eNB CONFIGURATION TRANSFER message further includes other relevant information such as the source and target eNB ID.

The MME relays the response by sending the MME CONFIGURATION TRANSFER message including the indication of Dual Connectivity support to the initiating eNB 1 identified by the source eNB ID (S1907).

Then, when the eNB 1 received the MME CONFIGURATION TRANSFER message including the indication of Dual Connectivity support, it is notified that the eNB 2 supports Dual Connectivity function (i.e., split bearer option, SCG bearer option, or both options for UE).

Later, in case that the eNB 2 supports the Dual Connectivity for a UE, the eNB 1 and the eNB 2 may transmit and receive the signaling for the Dual Connectivity function (split bearer option, SCG bearer option, or both options) and provide radio resources to the UE for each eNB through the cooperation among eNBs.

In the above, it is assumed that the UE currently served by the macro eNB discovers the small cell eNB. Meanwhile, for the other case (the UE currently served by the small cell eNB discovers the macro eNB), and similar TNL address scheme can be applied.

Referring to FIG. 20, the eNB 2 sends the eNB CONFIGURATION TRANSFER message containing indication of Dual Connectivity support to the MME to request the TNL address of the eNB 1 (S2001).

Here, the indication of Dual Connectivity support represents whether the eNB 2 supports the Dual Connectivity function (split bearer option, SCG bearer option, or both options) for a UE. In addition, the eNB CONFIGURATION TRANSFER message includes relevant information such as the source and target eNB ID (i.e. ECGI).

The MME relays the request by sending the MME CONFIGURATION TRANSFER message including the indication of Dual Connectivity support to the eNB 1 identified by the target eNB ID (S2003).

Then, when the eNB 1 received the MME CONFIGURATION TRANSFER message including the indication of Dual Connectivity support, it is notified that the eNB 2 supports the Dual Connectivity function (i.e., split bearer option, SCG bearer option, or both options for UE).

The eNB 1 responds by sending the eNB CONFIGURATION TRANSFER message containing one or more TNL addresses to be used for SCTP connectivity with the initiating eNB 2 to MME (S2005).

The eNB CONFIGURATION TRANSFER message further includes other relevant information such as the source and target eNB ID.

The MME relays the response by sending the MME CONFIGURATION TRANSFER message to the initiating eNB 2 identified by the source eNB ID (S2007).

Later, in case that the eNB 2 supports the Dual Connectivity for a UE, the eNB 1 and the eNB 2 may transmit and receive the signaling for the Dual Connectivity function (split bearer option, SCG bearer option, or both options) and provide radio resources to the UE for each eNB through the cooperation among eNBs.

2) Case 2: The case that the macro eNB and the small cell eNB have the X2 connection and the Xn connection FIG. 21 is a drawing exemplifying the X2 Setup procedure according to an embodiment of the present invention.

In FIG. 21, it is assumed that the eNB 1 is the macro eNB (MeNB) and the eNB 2 is the small cell eNB (SeNB).

FIG. 21 (a) illustrates the X2 Setup procedure initiated by the eNB 1, and FIG. 16 (b) illustrates the X2 Setup procedure initiated by the eNB 2.

Referring to FIG. 21 (a), the eNB 1 initiates X2 Setup procedure by sending the X2 SETUP REQUEST message address to the eNB 2 (S2101).

The eNB 1 may include one additional TNL address of the eNB 1 in the X2 SETUP REQUEST message so that eNB 2 to initiate the Xn setup. In addition, the X2 SETUP REQUEST message may include the same information described in FIG. 13 as well as the additional TNL address of the eNB 1.

If the eNB 2 can accept the setup, the eNB 2 replies with the X2 SETUP RESPONSE message to the eNB 1 (S2103).

The X2 SETUP RESPONSE message may include the additional TNL address of eNB 2 and/or an indication of Dual Connectivity support (or indication of added Dual Connectivity functions). In addition, the X2 SETUP RESPONSE message may include the same information described in FIG. 13 as well as the additional TNL address of the eNB 2 and/or the indication of Dual Connectivity support.

Here, the indication of Dual Connectivity support represents whether the eNB 2 supports the Dual Connectivity function (split bearer option, SCG bearer option, or both options) for a UE. In addition, when the small cell is required in eNB 1 later, the indication of Dual Connectivity support may be used for acquiring the TNL address of the eNB 2 from the eNB 1. For example, the eNB 1 may acquire the TNL address of the eNB 2 through the TNL address procedure, the eNB configuration update procedure or other special message.

When receiving the X2 SETUP RESPONSE message from the eNB 2, the eNB 1 decides to initiate the Xn setup right now or later when it is necessary.

Further, when eNB 1 received the X2 SETUP RESPONSE message including the indication of Dual Connectivity support, it is notified that the eNB 2 supports Dual Connectivity function (i.e., split bearer option, SCG bearer option, or both options for UE).

Referring to FIG. 21 (b), the eNB 2 initiates X2 Setup procedure by sending X2 SETUP REQUEST message to the eNB 1 (S2105).

The X2 SETUP REQUEST message may include the additional TNL address of eNB 2 and/or an indication of Dual Connectivity support (or indication of added Dual Connectivity functions). In addition, the X2 SETUP REQUEST message may include the same information described in FIG. 13 as well as the additional TNL address of the eNB 2 and/or the indication of Dual Connectivity support.

Here, the indication of Dual Connectivity support represents whether the eNB 2 supports the Dual Connectivity function (split bearer option, SCG bearer option, or both options) for a UE. In addition, when the small cell is required in eNB 1 later, the indication of Dual Connectivity support may be used for acquiring the TNL address of the eNB 2 from the eNB 1. For example, the eNB 1 may acquire the TNL address of the eNB 2 through the TNL address procedure, the eNB configuration update procedure or other special message.

Then, when the eNB 1 received the X2 SETUP REQUEST message including the indication of Dual Connectivity support, it is notified that the eNB 2 supports the small cell function (i.e., split bearer option, SCG bearer option, or both options for UE).

If the eNB 1 can accept the setup, the eNB 1 replies with the X2 SETUP RESPONSE message to the eNB 1 (S2107).

The eNB 1 may include one additional TNL address of the eNB 1 in the X2 SETUP RESPONSE message so that eNB 2 to initiate the Xn setup. In addition, the X2 SETUP RESPONSE message may include the same information described in FIG. 13 as well as the additional TNL address of the eNB 1.

When receiving the X2 SETUP REQUEST message from the eNB 2, the eNB 1 decides to initiate the Xn setup right now or later when it is necessary. In other words, the eNB 1 initiates the Xn setup with the eNB 2 while transmitting the X2 SETUP RESPONSE message at the same time, or waits until it is necessary to setup Xn and it can be done through the TNL address procedure or eNB configuration update procedure or other special message.

The above indication of Dual Connectivity support could also be included in the eNB configuration update/response messages to realize the same goal as in X2 setup/response messages. These will be described with reference to FIG. 22 below.

FIG. 22 is a drawing exemplifying the eNB configuration update procedure according to an embodiment of the present invention.

In FIG. 22, it is assumed that the eNB 1 is the macro eNB (MeNB) and the eNB 2 is the small cell eNB (SeNB). FIG. 22 (a) illustrates the eNB configuration update procedure initiated by the eNB 1, and FIG. 22 (b) illustrates the eNB configuration update procedure initiated by the eNB 2.

Referring to FIG. 22 (a), the eNB 1 initiates the eNB configuration update procedure by sending the eNB CONFIGURATION UPDATE REQUEST message to the eNB 2 (S2201).

The eNB 1 may include one additional TNL address of the eNB 1 in the eNB CONFIGURATION UPDATE REQUEST message so that the eNB 2 initiates the Xn setup. In addition, the eNB CONFIGURATION UPDATE REQUEST message may include the same information described in FIG. 14 as well as the additional TNL address of the eNB 1.

The eNB 2 replies with the eNB CONFIGURATION UPDATE RESPONSE message to the eNB 1 (S2203).

The eNB CONFIGURATION UPDATE RESPONSE message may include an additional TNL address of eNB 2 and/or an indication of Dual Connectivity support (or indication of added Dual Connectivity functions). In addition, the eNB CONFIGURATION UPDATE RESPONSE message may include the same information described in FIG. 14 as well as the additional TNL address of the eNB 2 and/or an indication of Dual Connectivity support.

Here, the indication of Dual Connectivity support represents whether the eNB 2 supports the Dual Connectivity function (split bearer option, SCG bearer option, or both options) for a UE. In addition, when the small cell is required in eNB 1 later, the indication of Dual Connectivity support may be used for acquiring the TNL address of the eNB 2 from the eNB 1. For example, the eNB 1 may acquire the TNL address of the eNB 2 through the TNL address procedure or other special message.

When receiving the eNB CONFIGURATION UPDATE RESPONSE message from the eNB 2, the eNB 1 decides to initiate the Xn setup right now or later when it is necessary.

In addition, when the eNB 1 received the eNB CONFIGURATION UPDATE RESPONSE message including the indication of Dual Connectivity support, it is notified that the eNB 2 supports Dual Connectivity function (i.e., split bearer option, SCG bearer option, or both options for UE).

Referring to FIG. 22 (b), the eNB 2 initiates eNB configuration update procedure by sending eNB CONFIGURATION UPDATE REQUEST message to the eNB 1 (S2205).

The eNB CONFIGURATION UPDATE REQUEST message may include an additional TNL address of eNB 2 and/or an indication of Dual Connectivity support (or indication of added Dual Connectivity functions). In addition, the eNB CONFIGURATION UPDATE REQUEST message may include the same information described in FIG. 14 as well as the additional TNL address of the eNB 2 and/or an indication of Dual Connectivity support.

Here, the indication of Dual Connectivity support represents whether the eNB 2 supports the Dual Connectivity function (split bearer option, SCG bearer option, or both options) for a UE. In addition, when the small cell is required in eNB 1 later, the indication of Dual Connectivity support may be used for acquiring the TNL address of the eNB 2 from the eNB 1. For example, the eNB 1 may acquire the TNL address of the eNB 2 through the TNL address procedure or other special message.

Then, when the eNB 1 received the eNB CONFIGURATION UPDATE REQUEST message including the indication of Dual Connectivity support, it is notified that the eNB 2 supports Dual Connectivity function (i.e., split bearer option, SCG bearer option, or both options for UE).

The eNB 1 replies with the eNB CONFIGURATION UPDATE RESPONSE message to the eNB 2 (S2207).

The eNB 1 may include one additional TNL address of the eNB 1 in the eNB CONFIGURATION UPDATE RESPONSE message so that the eNB 2 initiates the Xn setup. In addition, the eNB CONFIGURATION UPDATE RESPONSE message may include the same information described in FIG. 14 as well as the additional TNL address of the eNB 1.

When receiving the eNB CONFIGURATION UPDATE REQUEST message from the eNB 2, the eNB 1 decides to initiate the Xn setup right now or later when it is necessary. In other words, the eNB 1 initiates the Xn setup with the eNB 2 while transmitting the eNB CONFIGURATION UPDATE RESPONSE message at the same time, or waits until it is necessary to setup Xn and it can be done through the TNL address procedure or other special message.

In the situation as the same as in FIG. 17 above, the TNL address discovery procedure may be newly defined. This will be described with reference to FIG. 23.

FIG. 23 is a drawing conceptually illustrating the TNL address discovery according to an embodiment of the present invention.

Referring to FIG. 23, in case that UE currently served by macro eNB discovers small cell eNB (e.g., Pico eNB), the macro eNB requests the X2 interface TNL address of the small cell eNB (e.g., Pico eNB) to the MME.

Here, the request may be a general TNL address request, and may include an identifier that indicates it is the TNL address request for additional Xn setup. The macro eNB may proceed with the Xn and X2 setup, or proceed with the Xn setup though, regardless of this, may include an identifier that indicates it is the TNL address request for the Xn setup.

When receiving the request of the macro eNB from the MME, the small cell eNB may respond 2 TNL addresses (X2 setup and Xn setup) or the identifier indicating that one TNL address and the corresponding TNL address are designed for the Xn setup. In other words, in case that both of the X2 and Xn interface are required, the small cell eNB may transmit 2 TNL addresses (X2 setup and Xn setup) to the MME. In other words, when only the Xn interface is required to setup, the small cell eNB may transmit the indicator indicating that the corresponding TNL address is for the Xn setup while transmitting only one TLN address to the MME.

When receiving the response from the small cell eNB, the MME forwards the response received from the small cell eNB to the macro eNB.

Hereinafter, the TNL address discovery procedure according to an embodiment of the present invention will be described with reference to FIG. 24 and FIG. 25 below.

FIG. 24 and FIG. 25 are drawings exemplifying the TNL address discovery procedure according to an embodiment of the present invention.

In FIG. 24 and FIG. 25, it is assumed that the eNB 1 is the macro eNB (MeNB) and the eNB 2 is the small cell eNB (SeNB). FIG. 24 illustrates the TNL address discovery procedure initiated by the eNB 1, and FIG. 25 illustrates the TNL address discovery procedure initiated by the eNB 2.

In addition, in FIG. 24 and FIG. 25, it is assumed that the eNB 1 has TAI 1, and the small cell eNB (e.g., Pico eNB) has the small cell ID and TAI 2.

The eNB 1 sends the eNB CONFIGURATION TRANSFER message to the MME to request the TNL address of the eNB 2 (S2401).

Here, the eNB CONFIGURATION TRANSFER message may include macro eNB ID 1, TAI 1, small cell ID, TAI 2, and SON information request.

In addition, the eNB CONFIGURATION TRANSFER message may include the general TNL address request or an identifier indicating that it is the TNL address request for the Xn setup. The macro eNB may proceed with the Xn and X2 setup, or proceed with the Xn setup though, regardless of this, may include an identifier that indicates it is the TNL address request for the Xn setup.

The MME relays the request by sending the MME CONFIGURATION TRANSFER message to the eNB 2 identified by the target eNB ID (i.e., small cell ID) (S2403).

Here, the MME CONFIGURATION TRANSFER message may include the general TNL address request or an identifier indicating that it is the TNL address request for the Xn setup.

When receiving the MME CONFIGURATION TRANSFER message from the MME, the target small cell decides to respond 2 TNL addresses (X2 setup and Xn setup) or respond the identifier indicating that one TNL address and the corresponding TNL address are designed for the Xn setup (S2405).

In case that both of the X2 and Xn interface are required, the small cell eNB may decide to transmit 2 TNL addresses (X2 setup and Xn setup) to the MME. In other words, when only the Xn interface is required to setup, the small cell eNB may decide to transmit the indicator indicating that one TNL address and the corresponding TNL address are designed for the Xn setup.

The eNB 2 responds by sending the eNB CONFIGURATION TRANSFER message to MME (S2407).

Here, following the decision of step, S2405, the eNB CONFIGURATION TRANSFER message may include 2 TNL addresses (X2 setup and Xn setup) or an identifier indicating that one TNL address and the corresponding TNL address are designed for the Xn setup.

The MME relays the response by sending the MME CONFIGURATION TRANSFER message to the initiating eNB 1 identified by the source eNB ID (i.e., macro eNB ID 1) (S2409).

Here, the MME CONFIGURATION TRANSFER message may include 2 TNL addresses (X2 setup and Xn setup) or an identifier indicating that one TNL address and the corresponding TNL address are designed for the Xn setup.

Later, the eNB 1 and the eNB 2 perform the SCTP Setup procedure through transmitting and receiving the SCTP SETUP REQUEST/RESPONSE message (S2411), and perform the X2/Xn Setup procedure through transmitting and receiving the X2/Xn SETUP REQUEST/RESPONSE message (S2413).

In the above, it is assumed that UE currently served by macro eNB discovers small cell eNB. Meanwhile, for the other case (UE currently served by small cell eNB discovers macro eNB), similar TNL address scheme can be applied.

Referring to FIG. 25, the eNB 2 sends the eNB CONFIGURATION TRANSFER message to the MME to request the TNL address of the eNB 1 (S2501).

In addition, the eNB CONFIGURATION TRANSFER message may include the general TNL address request.

Also, in case that both of the X2 connection and the Xn connection are not existed between the eNB 1 and the eNB 2, in order to ask the eNB 1 for 2 TNL addresses (X2 setup and Xn setup), the eNB CONFIGURATION TRANSFER message may include the indication of additional Xn interface TNL address request.

In addition, in case that there is the X2 connection between the eNB 1 and the eNB 2, but does not exist the Xn connection, in order to ask the eNB 1 for one TNL address (Xn setup), the eNB CONFIGURATION TRANSFER message may include the indication of additional Xn interface TNL address request.

Also, there is no Xn connection between the eNB 1 and the eNB 2, in order to initiate the Xn setup, the eNB CONFIGURATION TRANSFER message may include the Xn TNL address of eNB 2.

The MME relays the request by sending the MME CONFIGURATION TRANSFER message to the eNB 1 identified by the target eNB ID (S2503).

The eNB 1 responds by sending the eNB CONFIGURATION TRANSFER message to the MME (S2505).

The eNB 1 that receives the MME CONFIGURATION TRANSFER message, the eNB 1 decides how to respond as follows.

In case that the eNB 1 does not support the dual connectivity, the eNB 1 may transmit one TNL address to the MME through the eNB CONFIGURATION TRANSFER message.

In addition, in case that both of the X2 connection and the Xn connection are not existed between the eNB 1 and the eNB 2, the eNB 1 may transmit 2 TNL addresses (X2 setup and Xn setup) to the MME through the eNB CONFIGURATION TRANSFER message.

Also, in case that there is the X2 connection between the eNB 1 and the eNB 2, but does not exist the Xn connection, the eNB 1 may transmit the TNL address for Xn setup to the MME through the eNB CONFIGURATION TRANSFER message.

In addition, in case of receiving the TNL address for the Xn setup through the MME CONFIGURATION TRANSFER message, the eNB 1 may transmit the TNL address for the X2 setup through the eNB CONFIGURATION TRANSFER message.

The MME relays the response by sending the MME CONFIGURATION TRANSFER message to the initiating eNB 2 identified by the source eNB ID (S2507).

Apparatus for Implementing the Present Invention

FIG. 26 is a block diagram of a wireless communication apparatus according to an embodiment of the present invention.

Referring to FIG. 26, a wireless communication system includes a eNB 2610 and a plurality of UEs 2620 belonging to the eNB 2610. The eNB 2610 include both the aforementioned MeNB and SeNB.

The eNB 2610 includes a processor 2611, a memory 2612, a radio frequency (RF) unit 2613. The processor 2611 may be configured to implement the functions, procedures and/or methods proposed by the present invention as described in FIG. 1-25. Layers of a wireless interface protocol may be implemented by the processor 2611. The memory 2612 is connected to the processor 2611 and stores various types of information for operating the processor 2611. The RF unit 2613 is connected to the processor 2611, transmits and/or receives an RF signal.

The UE 2620 includes a processor 2621, a memory 2622, and an RF unit 2623. The processor 2621 may be configured to implement the functions, procedures and/or methods proposed by the present invention as described in FIG. 1-25. Layers of a wireless interface protocol may be implemented by the processor 2621. The memory 2622 is connected to the processor 2611 and stores information related to operations of the processor 2622. The RF unit 2623 is connected to the processor 2611, transmits and/or receives an RF signal.

The memories 2612 and 2622 may be located inside or outside the processors 2611 and 2621 and may be connected to the processors 2611 and 2621 through various well-known means. The eNB 2610 and/or UE 2620 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The method for signaling between eNBs in the wireless communication systems that support the Dual Connectivity of the present invention is described mainly by the examples which are applied to 3GPP LTE/LTA-A system though, but also available to be applied to other various wireless communication system as well as 3GPP LTE/LTE-A system.

The invention claimed is:

1. A method for signaling between eNBs in a wireless communication system that support Dual Connectivity, comprising:
   transmitting, by a first eNB, an RRC connection reconfiguration message for transmission of a measurement report to a terminal;
   receiving the measurement report from the terminal, when a reporting event occurs;
   transmitting, by a first eNB, an eNB CONFIGURATION TRANSFER message for requesting a first TNL (transport network layer) address of a second eNB for Dual Connectivity to a MME (Mobility Management Entity),
   wherein the eNB CONFIGURATION TRANSFER message includes a first ID for identifying the first eNB and a second ID for identifying the second eNB;
   receiving, by the first eNB, a MME eNB CONFIGURATION TRANSFER message including the first TNL address from the MME;
   transmitting, by the first eNB, an X2 SETUP REQUEST message for initiating X2 setup procedure to the second eNB;
   receiving, by the first eNB, an X2 SETUP RESPONSE message from the second eNB in response to an X2 SETUP REQUEST message; and
   transmitting and receiving, by the first eNB, signaling for the Dual Connectivity with the second eNB, if the second eNB supports the Dual Connectivity,
   wherein the MME eNB CONFIGURATION TRANSFER message or the X2 SETUP RESPONSE message includes a first indication indicating whether the second eNB supports the Dual Connectivity function.

2. The method of claim 1, wherein the Dual Connectivity function supports secondary cell group (SCG) bearer option, or split bearer option, or both SCG bearer option and split bearer option.

3. The method of claim 1, wherein the eNB CONFIGURATION TRANSFER message further includes a second indication indicating a request for the first TNL address, if the first TNL address is a TLN address for Xn setup.

4. the method of claim 3, wherein the MME eNB CONFIGURATION TRANSFER message further includes a third indication indicating that the first TNL address is an address for the Xn setup.

5. The method of claim 1,
   wherein the first TNL address indicates a TNL address for X2 setup, and
   wherein the MME eNB CONFIGURATION TRANSFER message further includes a second TNL address for Xn setup.

6. A first eNB for signaling between eNBs in a wireless communication system that support Dual Connectivity, the first eNB comprising:
   a transmitter and a receiver;
   a memory for storing data; and
   a processor functionally connected to the transmitter, the receiver and the memory,
   wherein the processor controls the transmitter or the receiver to:
   transmit an RRC connection reconfiguration message for transmission of a measurement report to a terminal,
   receive the measurement report from the terminal, when a reporting event occurs,
   transmit an eNB CONFIGURATION TRANSFER message for requesting a first TNL (transport network layer) address of a second eNB for Dual Connectivity to the MME (Mobility Management Entity), wherein the eNB CONFIGURATION TRANSFER message includes a first ID for identifying the first eNB and a second ID for identifying the second eNB,
   receive a MME eNB CONFIGURATION TRANSFER message including the first TNL address from the MME,
   transmit an X2 SETUP REQUEST message for initiating X2 setup procedure to the second eNB; and
   receive an X2 SETUP RESPONSE message from the second eNB in response to the X2SETUP REQUEST message, and
   transmit and receive signaling for the Dual Connectivity with the second eNB, if the second eNB supports the Dual Connectivity, wherein the MME eNB CONFIGURATION TRANSFER message or the X2 SETUP RESPONSE message includes a first indication indicating whether the second eNB supports the Dual Connectivity function.

* * * * *